US009880633B2

(12) United States Patent
Komaki et al.

(10) Patent No.: US 9,880,633 B2
(45) Date of Patent: Jan. 30, 2018

(54) EYEGLASSES-TYPE WEARABLE DEVICE AND METHOD USING THE SAME

(71) Applicant: KABUSHIKI KAISHA TOSHIBA, Minato-ku, Tokyo (JP)

(72) Inventors: Hiroaki Komaki, Tachikawa Tokyo (JP); Akira Tanaka, Mitaka Tokyo (JP); Kenichi Doniwa, Asaka Saitama (JP); Hiroki Kumagai, Kunitachi Tokyo (JP); Takashi Sudo, Fuchu Tokyo (JP); Yasuhiro Kanishima, Tokyo (JP); Nobuhide Okabayashi, Tachikawa Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/979,183

(22) Filed: Dec. 22, 2015

(65) Prior Publication Data
US 2017/0060252 A1 Mar. 2, 2017

(30) Foreign Application Priority Data
Sep. 1, 2015 (JP) .................................. 2015-172153

(51) Int. Cl.
*G06F 3/01* (2006.01)
*G02B 27/01* (2006.01)
(Continued)

(52) U.S. Cl.
CPC ........... *G06F 3/017* (2013.01); *G02B 27/017* (2013.01); *G06F 3/013* (2013.01);
(Continued)

(58) Field of Classification Search
None
See application file for complete search history.

(56) References Cited

U.S. PATENT DOCUMENTS 9,632,313 B1  4/2017 Madan et al.
2004/0203170 A1 10/2004 Barbera-Guillem
(Continued)

FOREIGN PATENT DOCUMENTS

JP  H05-211650 A  8/1993
JP  H10-147411 A  6/1998
(Continued)

OTHER PUBLICATIONS

"MGC3130 in Production" pp. 112-212 http://www.microchip.com/wwwproducts/Devices.aspx?product=MGC3130, Last Accessed Jan. 15, 2015.
(Continued)

*Primary Examiner* — Christopher Kohlman
(74) *Attorney, Agent, or Firm* — Rutan & Tucker, LLP

(57) ABSTRACT

An eyeglasses-type wearable device of an embodiment can handle various data inputs. The device includes right and left eye frames corresponding to positions of right and left eyes and nose pads corresponding to a position of a nose. Eye motion detection electrodes (sightline detection sensor electrodes) are provided with the nose pads to detect the eye motion of a user. Transmitter/receiver electrodes (capacitance sensor electrodes) of a gesture detector are provided with a part of the right and left eye frames to detect a gesture of the user. Various data inputs are achieved by a combination of input A corresponding to a gesture of the user detected by the gesture detector and input B corresponding to the eye motion of the user detected by the eye motion detector.

8 Claims, 13 Drawing Sheets

(51) Int. Cl.
*G06F 3/044* (2006.01)
*G06F 3/0485* (2013.01)
*G06F 3/0354* (2013.01)

(52) U.S. Cl.
CPC .......... *G06F 3/03547* (2013.01); *G06F 3/044* (2013.01); *G06F 3/0485* (2013.01); *G02B 2027/014* (2013.01); *G02B 2027/0178* (2013.01)

(56) References Cited

U.S. PATENT DOCUMENTS

| | | | |
|---|---|---|---|
| 2010/0110368 A1* | 5/2010 | Chaum | G02B 27/017 351/158 |
| 2010/0218131 A1 | 8/2010 | Holm-Petersen et al. | |
| 2012/0056847 A1* | 3/2012 | Milford | G06F 1/3231 345/174 |
| 2013/0169560 A1* | 7/2013 | Cederlund | G06F 3/013 345/173 |
| 2013/0242387 A1* | 9/2013 | Ozawa | G02B 27/2264 359/464 |
| 2014/0145079 A1 | 5/2014 | Omino | |
| 2014/0152444 A1* | 6/2014 | Lee | G08B 21/06 340/575 |
| 2014/0160424 A1* | 6/2014 | Benko | G06F 1/163 351/158 |
| 2014/0240484 A1 | 8/2014 | Kodama et al. | |
| 2014/0347265 A1* | 11/2014 | Aimone | G09G 3/003 345/156 |
| 2014/0351191 A1 | 11/2014 | Kon et al. | |
| 2015/0067580 A1* | 3/2015 | Um | G06F 3/0481 715/781 |
| 2015/0130355 A1 | 5/2015 | Rains, Jr. et al. | |
| 2015/0192774 A1 | 7/2015 | Watanabe et al. | |
| 2016/0132107 A1 | 5/2016 | Kanishima et al. | |
| 2016/0247322 A1 | 8/2016 | Komaki | |
| 2017/0212587 A1 | 7/2017 | Noda | |

FOREIGN PATENT DOCUMENTS

| | | |
|---|---|---|
| JP | 2000-354943 A | 12/2000 |
| JP | 2002-288294 A | 10/2002 |
| JP | 2003-196681 A | 7/2003 |
| JP | 2003-216687 A | 7/2003 |
| JP | 2004-102727 A | 4/2004 |
| JP | 2008-201569 A | 9/2008 |
| JP | 2009-279193 A | 12/2009 |
| JP | 2010-271928 A | 12/2010 |
| JP | 2011-081737 A | 4/2011 |
| JP | 2011-118683 A | 6/2011 |
| JP | 2012-041099 A | 3/2012 |
| JP | 2012-212991 A | 11/2012 |
| JP | 2013-020422 A | 1/2013 |
| JP | 2013-528871 A | 7/2013 |
| JP | 2013-244370 A | 12/2013 |
| JP | 2014-164482 A | 9/2014 |
| JP | 2014-228725 A | 12/2014 |
| JP | 2015-075832 A | 4/2015 |
| JP | 2015-088175 A | 5/2015 |
| JP | 2016-71539 A | 5/2016 |

OTHER PUBLICATIONS

U.S. Appl. No. 14/979,221, filed Dec. 22, 2015 Final Office Action dated Jul. 13, 2017.
U.S. Appl. No. 14/979,221, filed Dec. 22, 2015 Non-Final Office Action dated Mar. 3, 2017.

* cited by examiner

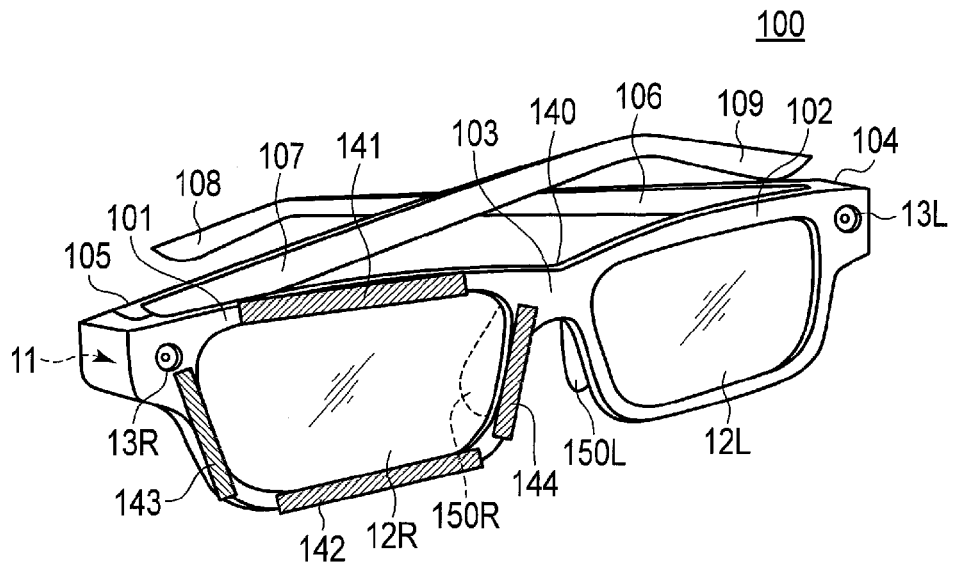
F I G. 1
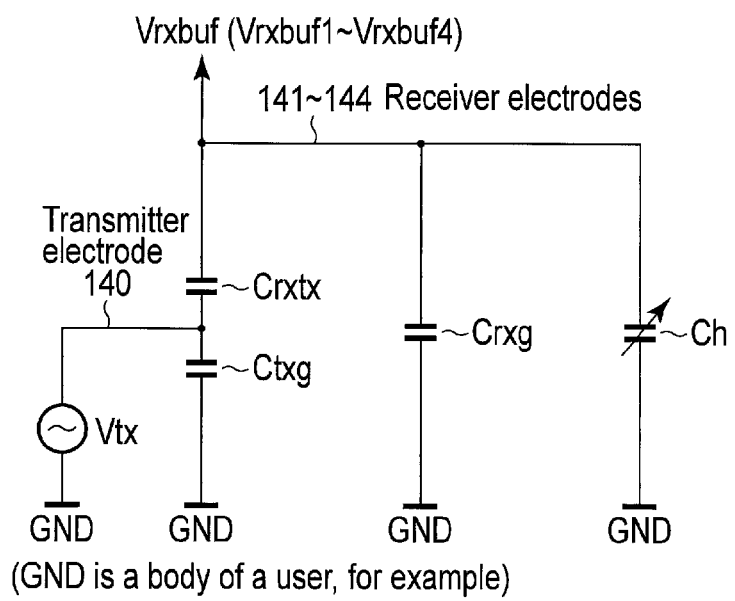
Vrxbuf = Vtx × {(Crxtx) / (Crxtx + Crxg + Ch)}
F I G. 2

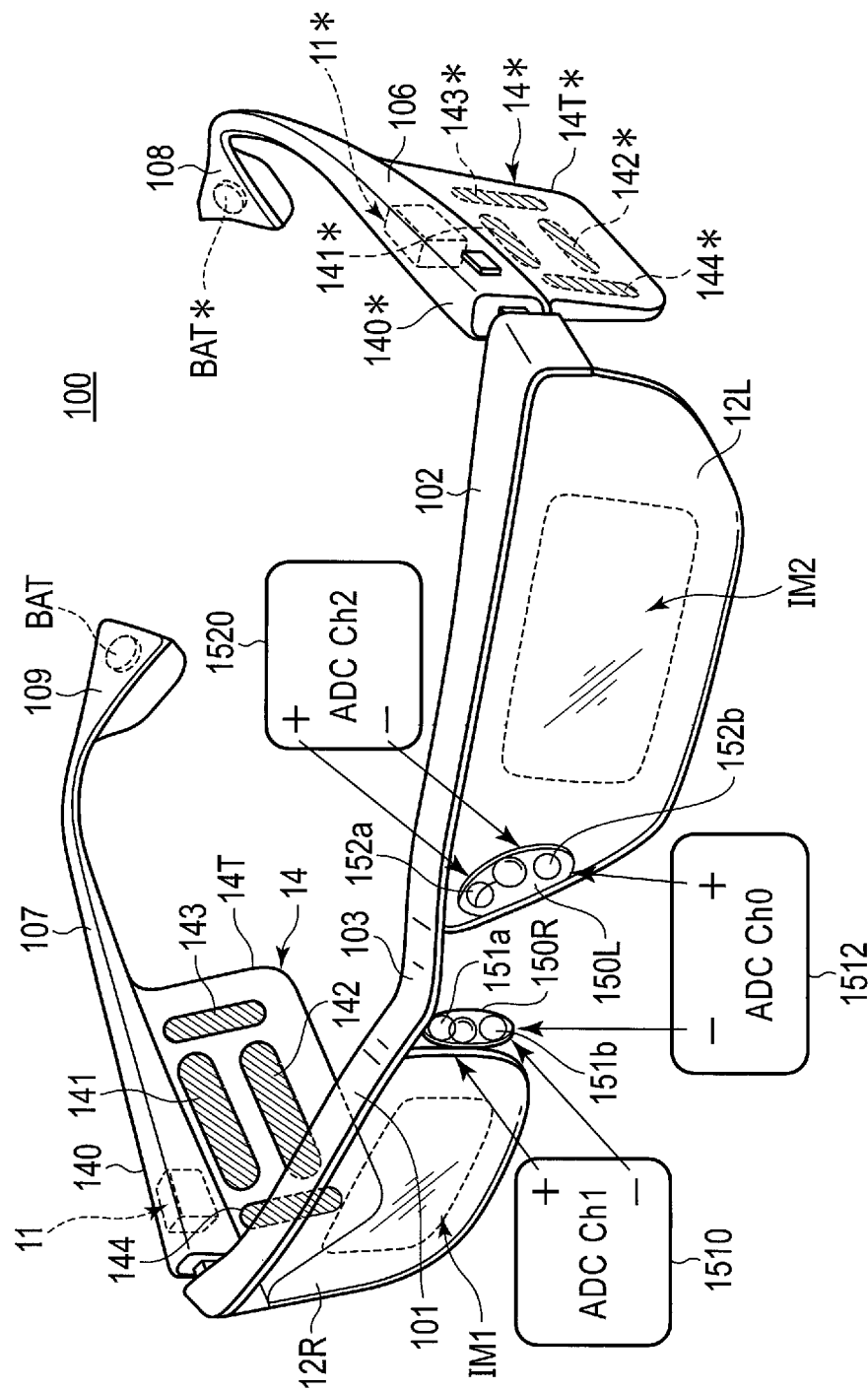
F I G. 4

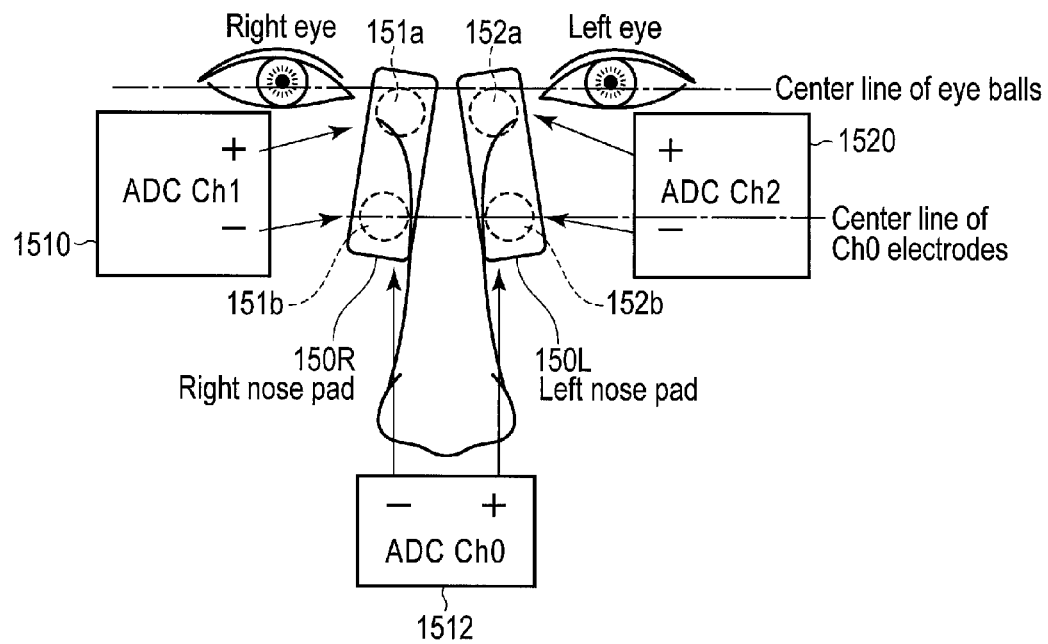
F I G. 6
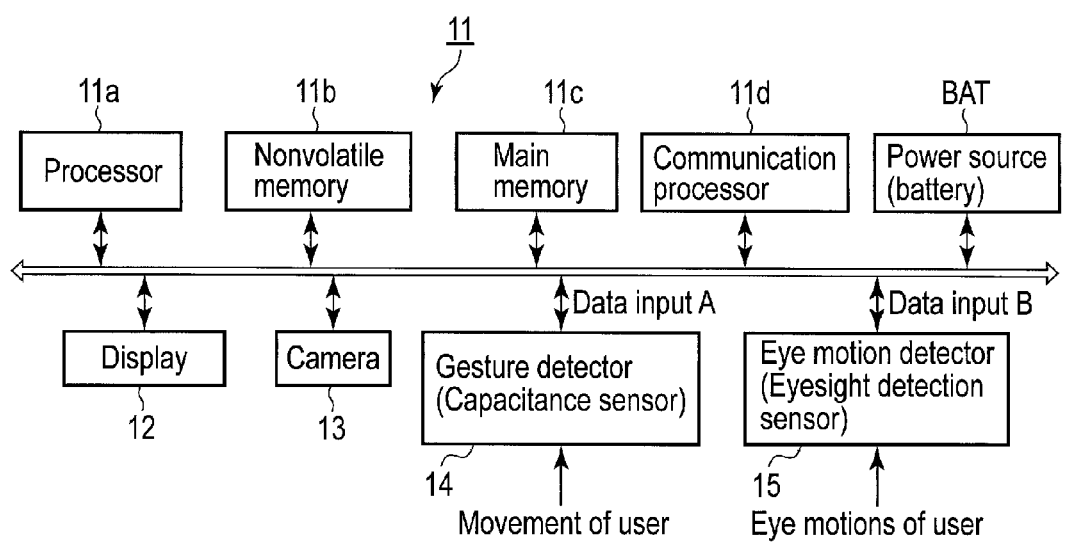
F I G. 7

Note: Vertical axis is detected signal level and horizontal axis is time (Effective range is part inside broken line: 256fs) Electro-oculogram (EOG) measured when eyes in front blink (instantly) closing for a second and stare in front (for four seconds), and this motion is repeated for five times

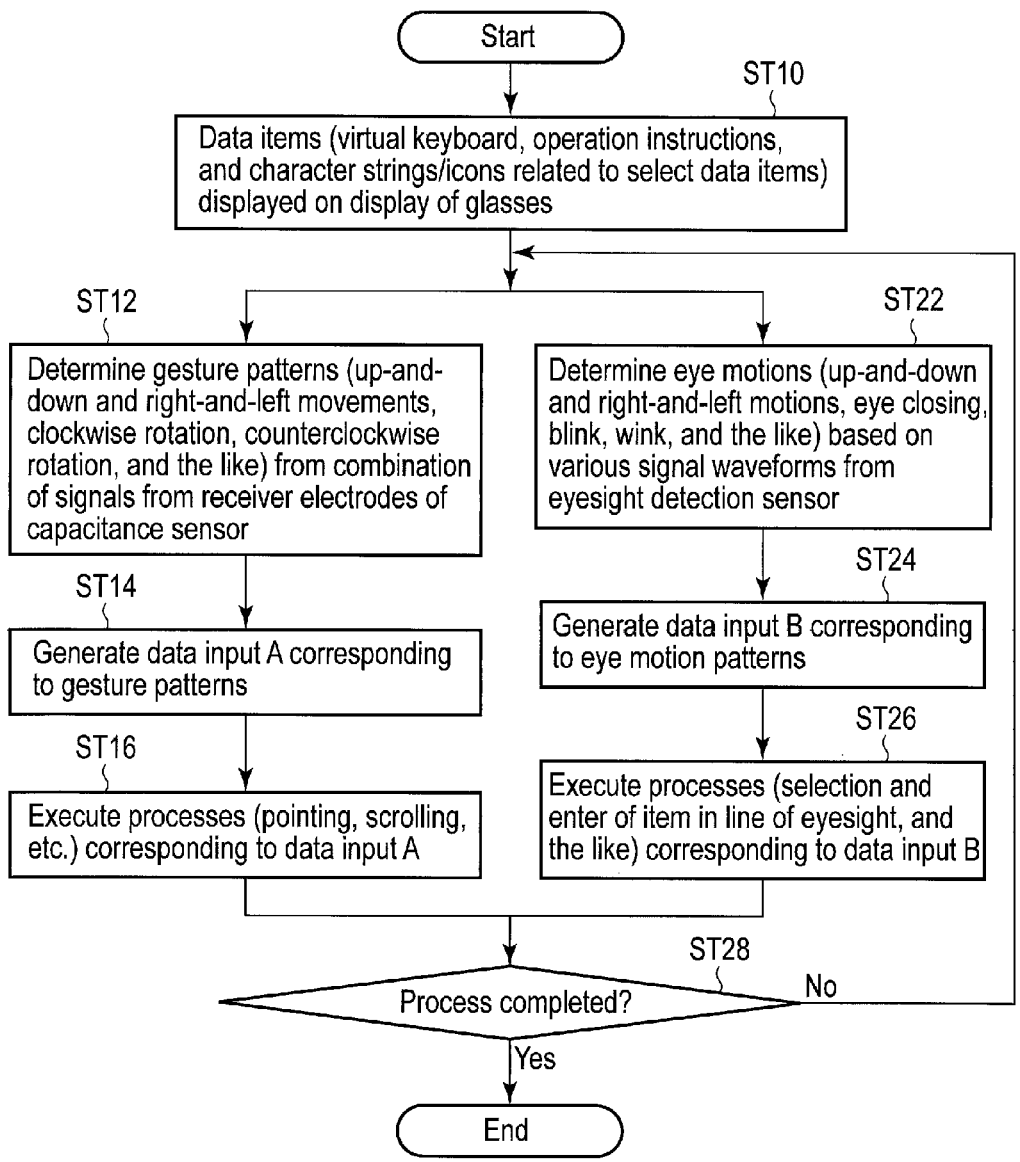
F I G. 15

EYEGLASSES-TYPE WEARABLE DEVICE AND METHOD USING THE SAME

CROSS-REFERENCE TO RELATED APPLICATIONS

This application is based upon and claims the benefit of priority from Japanese Patent Application No. 2015-172153, filed Sep. 1, 2015, the entire contents of which are incorporated herein by reference.

FIELD

Embodiments described herein relate generally to an eyeglasses-type wearable device.

BACKGROUND

Some of eyeglasses-type wearable devices (eyewear) detect an eye potential. In such eyewear, a change in an eye potential caused by eye motion or eye movements of a user is detected by detection electrodes provided with nose pads and a bridge (a part in front of the brow of the user) between eye frames of the glasses. The eye potential changes depending on types of the eye movements of the user (up-and-down and right-and-left movements and blinks). Using this mechanism, the user with the eyewear can perform data input corresponding to the types of the eye motion or eye movements.

According to the prior art eyewear, the electrode contacting the user is provided with the bridge, which does not contact a user in ordinary glasses. That is, in such eyewear, contact points with the face of the user are not only the nose pads and some user may possibly feel uncomfortable in wearing.

Furthermore, the data input is only made by the eye movements in the prior art eyewear and eyestrain should be considered. Thus, data amount (or the number of data items) which can be input in series and types of the data to be input are limited.

Therefore, as a target of the present application, embodiments present an eyeglasses-type wearable device which can handle various data inputs.

According to an embodiment, the eyeglasses-type wearable device has right and left eye frames arranged near the positions of right and left eyes and nose pads arranged at the position of a nose, and the device includes a display provided with at least one of the right and left eye frames, a gesture detector which detects a gesture indicative of a movement of a user, and an eye motion detector which detects eye motion or eye movement of the user. (Since the display is provided with at least one of the right and left eye frames, the gesture detector can be provided with at least one of the right and left eye frames.) The eye motion detector can be provided with the nose pads, and an electrode contacting the brow of the user may not be required.

Data input from the gesture detector (data input A) and data input from the eye motion detector (data input B) are obtained and a combination thereof can be used. Input data types can be increased by using such a combination, the eyeglasses-type wearable device which can accepts various data inputs can be achieved.

Furthermore, the data input operation is performed by not only eye motion or eye movements but also gestures, and thus, eye strain of the user can be reduced.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 shows an eyeglasses-type wearable device of an embodiment, and shows an example of an arrangement of gesture detection capacitance sensor electrodes (140 to 144).

FIG. 2 shows how to obtain detection voltage signals (Vrxbuf) from a change in a capacitance (Ch) corresponding to gestures.

FIG. 4 shows an eyeglasses-type wearable device of a still another embodiment, and shows another example of the arrangement of capacitance sensor electrodes (140 to 144 and 141\* to 144\*) for the gesture detection.

FIG. 6 shows an example of how to extract detection signals from the eye motion detection electrodes (151*a*, 151*b*, 152*a*, and 152*b*) provided with nose pads.

FIG. 7 shows a data processor 11 (integrated circuit including, for example, a processor 11*a*, nonvolatile memory 11*b*, main memory 11*c*, communication processor 11*d*, and sensor 11*e*) attachable to the eyeglasses-type wearable devices of various embodiments and peripheral devices (such as a display 12, camera 13, gesture detector 14, eye motion detector 15, and power source BAT).

FIG. 15 is a flowchart which shows processes performed by combinations of data inputs by gestures (data input A) and data inputs by eye motion or eye movements (data input B).

DETAILED DESCRIPTION

Figure 3:
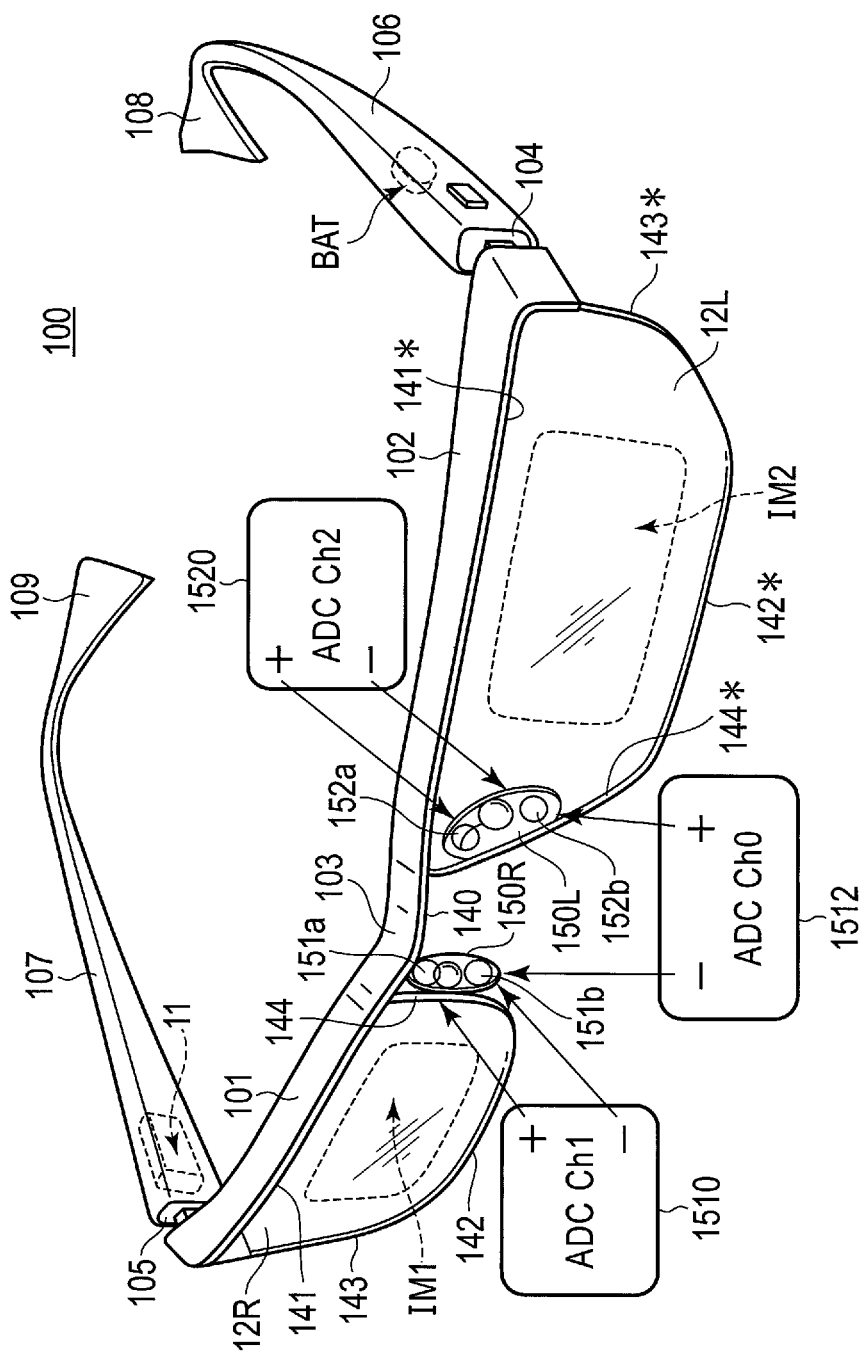
FIG. 3 shows an eyeglasses-type wearable device of another embodiment, and shows an example of the arrangement of capacitance sensor electrodes (140 to 144 and 141\* to 144\*) for the gesture detection and an example of the arrangement of eye motion detection electrodes (151*a*, 151*b*, 152*a*, and 152*b*) provided with a nose pad.

Hereinafter, various embodiments will be explained with reference to accompanying drawings.

These embodiments may relate to various wearable devices including any of an eyeglasses-type wearable device, a glasses-type wearable device, a spectacle-type wearable device, and the like. In this specification (including detailed description and claims) these various wearable devices are simply represented by the term "eyeglasses-type wearable device" unless otherwise noted. In other words, the term "eyeglasses-type wearable device" should be broadly interpreted as a wearable device regarding an eye or eyes.

The "user" used in this specification may have the meaning of "operator" or "worker" in a warehouse.

FIG. 1 shows an exterior of an eyeglass-type wearable device 100 of an embodiment. In this example, a right eye frame (right rim) 101 and a left eye frame (left rim) 102 are connected by a bridge 103. The right and left eye frames 102 and 101 and the bridge 103 can be formed of a conductive material such as a lightweight metal (e.g., aluminum alloy or titanium). The outer left side of the left eye frame 102 is connected to a left temple bar 106 via a left hinge 104 and a left end cover (left ear pad) 108 is provided with the tip of the left temple bar 106. Similarly, the outer right side of the right eye frame 101 is connected to a right temple bar 107 via a right hinge 105 and a right end cover (right ear pad) 109 is provided with the tip of the right temple bar 107.

A data processor 11 (an integrated circuit of a few millimeter square) is embedded in a part of the eye frame 101 near the right hinge 105 (or inside the right temple bar 107). The data processor 11 is an LSI in which a microcomputer, memory, communication processor, and the like are integrated (the data processor 11 will be detailed later with reference to FIG. 7).

Although this is not depicted in FIG. 1, a small battery such as lithium-ion battery (corresponding to BAT in FIG. 3) is embedded in, for example, the left temple bar 106 in the proximity of the left hinge 104 (or inside the end cover 108 or 109) as a power source required for the operation of the eyeglass-type wearable device 100.

A left camera 13L is attached to the end of the left eye frame 102 near the left hinge 104, and a right camera 13R is attached to the end of the right eye frame 101 near the right hinge 105. A micro CCD image sensor can be used for the cameras.

The cameras (13L and 13R) may be used as a stereo camera. Or, an infrared camera (13R) and a laser (13L) may be provided with the camera positions as a distance sensor using a combination of the infrared camera and the laser. The distance sensor may be composed of a micro semiconductor microphone (13R) which collects ultrasonic waves and a micro piezoelectric speaker (13L) which generates ultrasonic waves.

Note that, a center camera (not shown) may be provided with the bridge 103 instead of or in addition to the right and left cameras 13R and 13L. Or, the device may not include any camera at all. (The cameras are shown as a camera 13 in FIG. 7.)

A left display 12L is fit in the left eye frame 102, and a right display 12R is fit in the right eye frame 101. The display is provided with at least one of the right and left eye frames and is formed of film liquid crystal or the like. Specifically, a film liquid crystal display device adopting polymer diffusion liquid crystal (PDLC) without a polarizer can be used as one or both of the right and left displays 12R and 12L (the display is depicted as a display 12 in FIG. 7). Note that, if the display 12R alone is provided with the right eye frame 101, a transparent plastic plate is fit in the left eye frame 102.

The bridge 103 is connected to a transmitter electrode 140 and the transmitter electrode 140 is electrically and mechanically connected to the eye frame 101 (and 102). Four receiver electrodes 141 to 144 are provided with the periphery of the right eye frame 101. Specifically, a north receiver electrode (upper electrode) 141 is disposed at the upper side of the right eye frame 101 via (i.e., insulated from the transmitter electrode) a dielectric layer which is not shown. Similarly, a south receiver electrode (lower electrode) 142 is disposed at the lower side of the right eye frame 101, a west receiver electrode (right electrode) 143 is disposed at the right side of the same, and an east receiver electrode (left electrode) 144 is disposed at the left side of the same. (Generally speaking, the metal bridge 103 which is connected to the transmitter electrode 140 is electrically connected to the entirety of the metal eye frame 101 and the electrodes 141 to 144 face the four parts of the eye frame 101 through a dielectric insulating layer.) The electrodes 140 to 144 are electrically separated from each other and are connected to the data processor 11 through insulating interconnection members (not shown). The electrodes 140 to 144 are used as capacitance sensors and are structural components of a gesture detector 14 shown in FIG. 7.

Note that, the electrodes 141 to 144 are depicted conspicuously in FIG. 1 for easier understanding. However, in an actual product, the electrodes 141 to 144 can be formed more inconspicuously by, for instance, embedding in the eye frames.

Furthermore, capacitance sensor electrodes (141 to 144) are provided with only the right eye frame 101 side in FIG. 1; however, similar electrodes (141* to 144*) may be provided with the left eye frame 102 side as in the example shown in FIG. 3. In other words, the capacitance sensor electrodes (141 to 144/141* to 144*) can be provided with the right eye frame 101 side and/or the left eye frame 102 side.

A nose pad is disposed between the right and left eye frames 101 and 102 and below the bridge 103. The nose pad includes a left nose pad 150L and a right nose pad 150R. Although this is not depicted in FIG. 1, right nose pad electrodes 151a and 151b are provided with the right nose pad 150R, and left nose pad electrodes 152a and 152b are provided with the left nose pad 150L (cf. FIGS. 3 to 6).

The electrodes 151a, 151b, 152a, and 152b are electrically separated from each other and are connected to three AD converters (ADC 1510, 1520, and 1512) via insulating interconnection members (not shown). Outputs from the ADCs have different signal waveforms corresponding to motions of user's eyes adjacent to the right and left eye frames and are supplied to the data processor 11 in FIG. 7 as digital data with contents corresponding to the eye motions of the user. The electrodes 151a, 151b, 152a, and 152b are used as sightline detection sensors, and the electrodes 151a, 151b, 152a, and 152b and three AD converters are components of an eye motion detector 15 of FIG. 7.

The eyeglass-type wearable device 100 of FIG. 1 is mounted on the head of the user (not shown) by the right and left nose pads (150R and 150L), right and left temple bars (106 and 107), and right and left end covers (108 and 109). In the example of FIG. 1, only the right and left nose pads (150R and 150L), right and left temple bars (106 and 107), and right and left end covers (108 and 109) are in direct contact with the head (or face) of the user; however, parts other than the above (nose pads, temple bars, and end covers) may be in contact with the user for, for example, balancing a voltage between the ADCs (FIGS. 3, 4, and 5) and the body of the user.

FIG. 2 shows how to obtain detection voltage signals (Vrxbuf) from a change in a capacitance (Ch) corresponding to a gesture (for example, a hand or finger movement of the user). Here, the body of the user who wears the eyeglass-type wearable device 100 in FIG. 1 is at a ground potential (GND). Since a human body is electrically conductive, the hands and fingers of the user are assumed to be the ground potential (GND). The following explanation will be given as a general example of how to obtain the detection signals corresponding to a gesture, in which the electrodes 141 to 144 are at one of the right and left eye frames for simplification.

Here, one receiver electrode (one of 141 to 144, e.g., 141) is between the transmitter electrode 140 and the GND (a hand or finger of the user, for example) and a capacitance between the transmitter electrode 140 and the receiver electrode 141 is Crxtx. Furthermore, a capacitance between the transmitter electrode 140 and the GND is Ctxg, a capacitance between the receiver electrode 141 and the GND is Crxg, and a capacitance between the hand or finger of the user (GND) which performs a gesture to be detected and the receiver electrode is Ch (Ch varies corresponding to a gesture of the user). In consideration of the capacitance Ch made by the hand of the user, Crxg+Ch is the total capacitance between the receiver electrode 141 and the GND. When a high-frequency voltage Vtx is applied between the transmitter electrode 140 and the GND, the signal voltage obtained from the receiver electrode 141 will be expressed as follows.

$$Vrxbuf = Vtx \times \{(Crxtx)/(Crxtx+Crxg+Ch)\} \quad (1)$$

The capacitances (Crxtx and Crxg) are different in each of the receiver electrodes 141 to 144, and the capacitance (Ch) varying corresponding to the gesture of the user is different in each of the receiver electrodes 141 to 144. Therefore, the voltage signals (Vrxbuf1 to Vrxbuf4) obtained from respective receiver electrodes 141 to 144 will be different. However, each of the different voltage signals (Vrxbuf1 to Vrxbuf4) can be obtained by the formula (1).

From the four receiver electrodes 141 to 144, four voltage signals (Vrxbuf1 to Vrxbuf4) each varying corresponding to the gesture of the user can be obtained. A change manner in the voltage signals corresponds to a gesture of the user (for example, if the four voltage signals are represented by bar graphs, the heights of the four bars are independent and different from each other but a pattern of changes in the four bar-heights should correspond to the gesture of the user). The four voltage signals (Vrxbuf1 to Vrxbuf4) change corresponding to the movements of a hand or a finger such as up-and-down and right-to-left swings, clockwise or counterclockwise rotations, and movements closer to or distant from the receiver electrodes. Thus, if corresponding relationships between the gesture patterns of users (hand or finger up-and-down movement, rotation, and the like) and change patterns of the four voltage signals (Vrxbuf1 to Vrxbuf4) are checked or examined in advance, the gestures of users can be identified and detected. Consequently, a gesture of swiping up a finger from the below (south side) to the above (north side) can be translated into a command of screen scroll from the below to the above, for example.

Note that, a 3D gesture sensor using the formula (1) is commercially available as MGC3130 (Single-Zone 3D Tracking and Gesture Controller) of Microchip Technology Inc. and its detailed data sheet can be obtained through the Internet. The principle of the 3D gesture sensor using the formula (1) is a publically-known technique. However, the embodiment in which a combination of the 3D gesture sensor and an eye motion sensor is used with an AR display by images IM1/IM2 (cf. FIG. 3) should be novel. (Here, "AR" is an acronym of Augmented Reality and indicates a technology of adding information to the real world viewed through glasses, for example.)

FIG. 3 shows an eyeglass-type wearable device of another embodiment, and shows an example of the arrangement of capacitance sensor electrodes (140 to 144 and 141\* to 144\*) for the gesture detection and an example of the arrangement of eye motion detection electrodes (151*a*, 151*b*, 152*a*, and 152*b*) provided with a nose pad. In the example of FIG. 3, receiver electrodes (141 to 144 and 141\* to 144\*) functioning the same as the receiver electrodes 141 to 144 depicted relatively large in FIG. 1 are arranged in the periphery of the eye frames 101 and 102 in an inconspicuous manner. (The receiver electrodes 141 to 144 and the receiver electrodes 141\* to 144\* in FIG. 3 may, with slight exaggeration, be symmetrically arranged at right and left sides with a positional relationship similar to the electrodes 141 to 144 in FIG. 1.)

In FIG. 3, the receiver electrodes 141 to 144 at the right side are insulated from each other, and are disposed to face the metal part of the frame 101 connected to the transmitter electrode 140 via an insulating material (such as a plastic or a polypropylene film often used in a small capacitor) which is not shown. Similarly, the receiver electrodes 141\* to 144\* at the left side are insulated from each other, and are disposed to face the metal part of the frame 102 connected to the transmitter electrode 140 via an insulating material which is not shown.

In FIG. 3, right nose pad electrodes 151*a* and 151*b* are disposed above and below the right nose pad 150R, and left nose pad electrodes 152*a* and 152*b* are disposed above and below the left nose pad 150L. Outputs from the right nose pad electrodes 151*a* and 151*b* are supplied to the ADC 1510, and outputs from the left nose pad electrodes 152*a* and 152*b* are supplied to the ADC 1520, and outputs from the lower right and left nose pad electrodes 151*b* and 152*b* (or outputs from the upper right and left nose pad electrodes 151*a* and 152*a*) are supplied to the ADC 1512.

Ch1 signals which change corresponding to up-and-down motions of the right eye of the user can be obtained through the ADC 1510. Ch2 signals which change corresponding to up-and-down motions of the left eye of the user can be obtained through the ADC 1520. Ch0 signals which change corresponding to motions of the right and left eyes of the user can be obtained through the ADC 1512. The up-and-down motions of the right and left eyes of the user can be evaluated by Ch1+2 signals representing an average of outputs of the ADCs 1510 and 1520. (A relationship between signal waveforms of Ch0, Ch1, Ch2, and Ch1+2 and eye motions will be described later with reference to FIGS. 8 to 14.)

Film liquid crystal of the right display 12R in FIG. 3 can display a right display image IM1 including, e.g., an icon group of a ten-keys (numbers, operators, enter-key, and the like), alphabets, and the like. Film liquid crystal of the left display 12L can display a left display image IM2 including, e.g., optional character strings, icons, and the like (contents shown on the displays 12R and 12L are optional). Ten-keys and alphabets shown on the right display 12R (or on the left display 12L) may be used for the input of numbers and letters. Character strings and icons displayed on the right display 12R (or on the left display 12L) may be used for the retrieval of specific data items and the selection/determination of a target item.

The display images IM1 and IM2 can be used to provide the augmented reality (AR) in which data including numbers and letters is added to the real world viewed through the glasses. The contents of the display image IM1 and the contents of the display image IM2 can be the same (IM1=IM2) or different (IM1≠IM2) depending on the type of embodiments. Furthermore, the display image IM1 (or IM2) can be displayed in the right display 12R and/or the left display 12L. If the contents of the AR display are required to be shown in a 3D image (with a depth) overlapping the real world viewed through the glasses, the display images IM1 and IM2 are different images for 3D display.

Furthermore, if the displays (12R and 12L) are positioned right and left, the images on the right and left displays (IM1 and IM2) can be shifted in opposite directions by, for example, adjusting an angle of convergence. This will reduce the workload of eyes viewing a target in the real world and the AR display alternately. However, normally, the same images are displayed in the right and left displays (12R and 12L).

The display control of the displays 12R and 12L can be performed by the data processor 11 embedded in the right temple bar 107. (Displaying letters and icons on a display is a well-known technique.) Power required for the operation of the data processor 11 and the like can be obtained from a battery BAT embedded in the left temple bar 106.

Note that, if a designer may wear a test product corresponding to the example of FIG. 3 and feel that a weight balance of the product is inappropriate, one of the reasons causing such inappropriateness may be the battery BAT in the left temple bar 106. In that case, a sinker may be provided with the right temple bar 107 to balance with the battery BAT in the left temple bar 106.

As in the example of FIG. 3, if the sensor electrodes (141 to 144 and 141* to 144*) are provided with the both sides of the device while the data processor 11 is provided with one side, a very-small flat cable (not shown) is passed through the frames 101 and 102 inconspicuously such that the electrodes 141* to 144* at the left side are connected to the data processor 11 at the right side. Similarly, a very-small flat cable (not shown) is passed through the frame 101 inconspicuously such that the electrodes 141 to 144 at the right side are connected to the data processor 11 at the right side. A similar very-small flat cable may be used in the connection of the nose pad electrode (151a, 151b, 152a, and 152b) to the data processor 11.

If two pairs of capacitance sensor electrodes (140 to 144 and 141* to 144*) for the gesture detection are disposed at both right and left sides, the number of the receiver electrodes of capacitance sensor is eight in total at the both sides. Then, eight kinds of detection signals (Vrxbuf) each changing corresponding to 3D gestures of right and left hands (or two or more fingers) are obtained. Data input A (FIG. 7) can be generated by combinations of changes in the detection signals. Various gestures can be detected using the data input A (for example, several sign language patterns may be detected).

Furthermore, with the two pairs of capacitance sensor electrodes (140 to 144 and 141* to 144*) for the gesture detection disposed at both right and left sides, a detectable range of the gesture movement (especially in the horizontal direction) can be increased. For example, in the example of FIG. 3, five gesture sections (right end of the right eye frame 101, center of the right eye frame 101, center of the bridge 103, center of the left eye frame 102, and left end of the left eye frame 102) will be given. In that case, fingers of a right hand can be moved between the right end of the right eye frame and the center of the right eye frame, between the right end of the right eye frame and the center of the bridge, between the right end of the right eye frame and the center of the left eye frame, and between the right end of the right eye frame and the left end of the left eye frame (or to the outside of the left end of the left eye frame).

A section in which a gesture is performed in the five sections can be determined based on a change condition of eight signal levels from the eight receiver electrodes of the capacitance sensors. (For example, if a finger is swung from right to left between the right end of the right eye frame to the left end of the left eye frame, eight electrode signal levels all change individually.) With the gesture movable range divided as above, a section in which a gesture is performed can be identified even if gestures in the same pattern are performed in any sections. Thus, determination results as to the sections in which the gestures are performed can be used to substantially increase the types of the commands input by data input A (as compared to a case where movable range is not identified).

Note that, in the example of FIG. 3 (or FIG. 1), a 3D gesture is detected when a right-handed user uses his/her right hand (right fingers) for the gesture in a 3D space in right front of the user (a space where the user sees the display image IM1) with the electrodes 141 to 144 at the right eye frame 101 side. Furthermore, as in the example of FIG. 3, with the capacitance sensor electrodes 141* to 144* for the gesture detection provided with the left eye frame 102 side (to surround the left display image IM2), a 3D gesture by a left hand in the 3D space in the left front of the user can be detected for improving the operability of a left-hand user.

If the device is made for a left-hand user only, only the electrodes 141* to 144* at the left eye frame 102 side may be used as the capacitance sensors for the gesture detection, and only the display image IM2 may be used for the gesture operation. That is, the electrodes 141 to 144 at the right eye frame 101 side and the display image IM1 may be omitted from a certain embodiment (the display contents of the display image IM2 may be the same as or different from the contents to be displayed by the display image IM1).

FIG. 4 shows an eyeglass-type wearable device of a still another embodiment. In this example, electrodes (140 to 144) of a capacitance sensor 14 for the gesture detection are provided with the right temple bar 107 side and left electrodes (140* to 144*) of a capacitance sensor 14* for the gesture detection are provided with the left temple bar 106 side. The right face of a user contacting the right temple bar 107 and the left right face of the user contacting the left temple bar 106 are the GND. A plastic tab 14T on which the electrodes 140 to 144 of the capacitance sensor 14 are formed to be electrically insulated from the GND is attached to the right temple bar 107. Similarly, a plastic tab 14T* on which electrodes 140* to 144* of the capacitance sensor 14T* are formed to be electrically insulated from the GND is attached to the left temple bar 106.

Tabs may be attached to the temple bars through the following manners, for example. That is, the tab 14T (or 14T*) may be mechanically fixed to the temple bar 107 (or 106) undetachably. Or, the tab 14T (or 14T*) may be detachably attached to a connector receiver (not shown) provided with the temple bar 107 (or 106) using a snap-lock multipoint connector or the like. A connector which detachable attaches the tab and the temple bar may be a micro USB or a micro HDMI (registered trademark) in consideration of a mechanical design for the sufficient mechanical strength after the connection.

In the example of FIG. 4, data processors 11 and 11* having the same functions are disposed inside the right temple bar 107 and the left temple bar 106, respectively. Furthermore, a battery BAT is attached inside the thick part of the right end cover 109, and a battery BAT* is attached inside the thick part of the left end cover 108.

In the example of FIG. 4, the right and left temple bars 107 and 106 are mounted partly on the rear sides of the right and left ear tabs (not shown) to be put on the head of the user. In that case, if the upper ends of the rear sides of the ear tabs of the user are considered as fulcrums, the weight balance between the front parts of the fulcrums (the part of the eye frames 101 and 102) and the rear parts of the fulcrums (the part of the end covers 109 and 108) is improved by the weight of the BAT and BAT*.

Furthermore, since the BAT and BAT* are arranged at the right and left sides, the right and left weight balance of the eyeglass-type wearable device 100 can be improved as being viewed from the center of the right and left eyes of the user.

Note that, although this is not shown, the structure of two data processors 11 and 11* provided with the right and left temple bars 107 and 106 and/or the structure of the two batteries BAT and BAT* provided with the right and left end covers 109 and 108 can be applied to the example of FIG. 3.

In the example of FIG. 4, representative gestures of a user may be frontward-and-backward and up-and-down movements of a hand or fingers in the proximity of the plastic tab 14T (or 14T*), rotation of the hand and fingers in the proximity of sides of the face, and movements to put the hand and fingers near to or away from the face.

Figure 5:
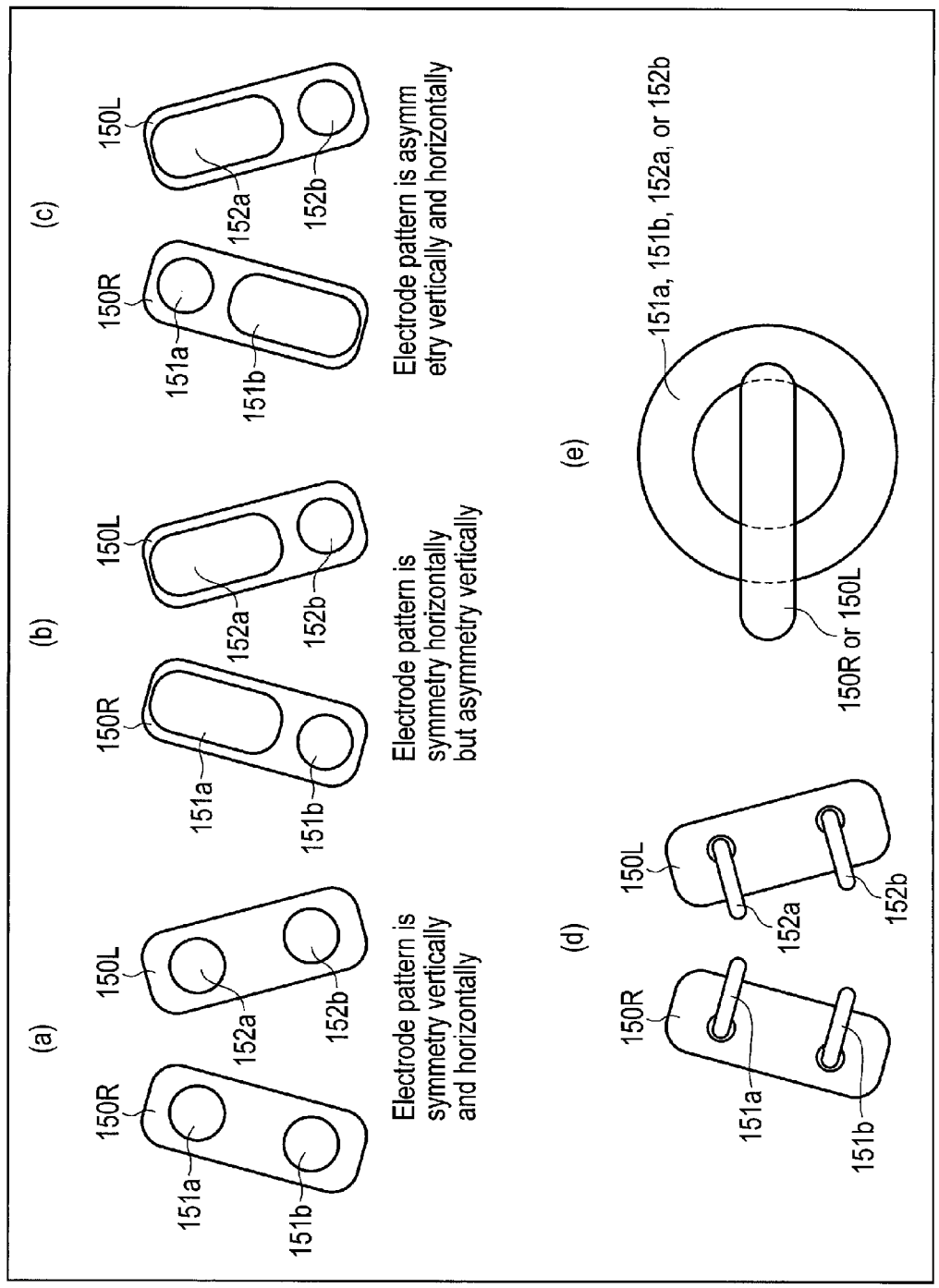
FIG. 5 shows various examples of eye motion detection electrodes (151*a*, 151*b*, 152*a*, and 152*b*) provided with nose pads.

FIGS. 5(*a*) to 5(*e*) show various examples of the nose pad electrodes (151*a*, 151*b*, 152*a*, and 152*b*) for the eye motion detection provided with the nose pads (150R and 105L). FIG. 5(*a*) shows four nose pad electrodes 151*a*, 151*b*, 152*a*, and 152*b* provided with the right and left nose pads in a vertically and horizontally symmetrical manner.

FIG. 5(*b*) shows an example where the four nose pad electrodes 151*a*, 151*b*, 152*a*, and 152*b* are provide with the right and left nose pads in a horizontally symmetry but vertically asymmetry manner. A down pressing force caused by the weight of the right and left eye frames works on the nose pads (150R and 150L). Thus, the lower nose pad electrodes (151*b* and 152*b*) sufficiently contact the skin of the nose of the user even if the area of the electrodes is small while the upper nose pad electrodes (151*a* and 152*a*) may not contact well with the skin of the nose of the user. Even if the nose pads (150R and 150L) are pressed down by the weight of the right and left eye frames and the contact of the upper nose pad electrodes (151*a* and 152*a*) tend to be insufficient, such insufficient contact of the upper nose pad electrodes (151*a* and 152*a*) can be improved by increasing the area of the upper nose pad electrodes (151*a* and 152*a*) as in FIG. 5(*b*).

FIG. 5(*c*) shows an example where the four nose pad electrodes 151*a*, 151*b*, 152*a*, and 152*b* are provide with the right and left nose pads in a horizontally and vertically asymmetry manner. The arrangement of FIG. 5(*c*) can be obtained through about 180° rotation of one of the nose pads of FIG. 5(*b*) (150R in this example). Depending on a skin condition of the nose of the user, location or posture of the user, or a mount condition of the glasses, better contact of the right and left nose pad electrodes may be obtained in the example of FIG. 5(*c*) than FIG. 5(*b*). In such a case, the right and left nose pads (150R and 150L) may be made rotatable such that both the arrangements of FIGS. 5(*b*) and 5(*c*) can be selected by the user.

The electrodes 151*a*, 151*b*, 152*a*, and 152*b* of FIGS. 5(*a*) to 5(*c*) are prepared by, for example, performing a metal evaporation process of a predetermined electrode pattern, printing a conductive paint, or attaching an electrode piece on a nose pad material of an insulating material/dielectric (such as ceramic, plastic, and rubber) formed in a predetermined shape. The electrodes 151*a*, 151*b*, 152*a*, and 152*b* may be flushed with the surface of the nose pad material, or may be formed as bumps on the surface of the nose pad material.

In the examples of FIGS. 5(*d*) and 5(*e*), holes are pierced through certain points on the right and left nose pads 150R and 150L and small metal rings are put in the holes to attach the four nose pad electrodes 151*a*, 151*b*, 152*a*, and 152*b*. In the examples, ring-shaped nose pad electrodes 151*a*, 151*b*, 152*a*, and 152*b* are shown; however, no limitation is intended thereby. These nose pad electrodes may be polygonal with rounded corners or may be partly cut such as a letter C, for example.

FIG. 6 shows an example of how to extract detection signals from the eye motion detection electrodes (151*a*, 151*b*, 152*a*, and 152*b*) provided with the nose pads. A potential difference between the upper electrode 151*a* and the lower electrode 151*b* of the right nose pad 150R is received by high input impedance of the ADC 1510 and Ch1 potential difference between the upper and lower electrodes which may vary with time is detected as digital data. A potential difference between the upper electrode 152*a* and the lower electrode 152*b* of the left nose pad 150L is received by high input impedance of the ADC 1520 and Ch2 potential difference between the upper and lower electrodes which may vary with time is detected as digital data.

Furthermore, a potential difference between the lower electrode 152*b* of the left nose pad 150L and the lower electrode 151*b* of the right nose pad 150R is received by high input impedance of the ADC 1512 and Ch0 potential difference between the right and left electrodes which may vary with time is detected as digital data. (Or, a potential difference between the upper electrode 152*a* of the left nose pad 150L and upper electrode 151*a* of the right nose pad 150R may be received by high input impedance of the ADC 1512 and Ch0 potential difference between the right and left electrodes which may vary with time may be detected as digital data.)

Note that ADCs 1510, 1520, and 1512 of FIG. 6 may be an ADC having a working voltage Vdd=3.3 V and a resolution of 24 bit. In that case, the weight of the detection signal level is $3.3\ V/(2^{24})$=(nearly) 200 nV. In the detection signal level shown in FIGS. 8 to 14, if the amplitude values of Ch1 and Ch2 are represented by 1000, for instance, the detection signal level from the ADCs is approximately 200 ρV in voltage.

Types of the eye motion and ranges of eye motion related to the eye motion detection of FIG. 6 are, for example, as follows.

<Types of Eye Motion>

(01) Compensative Eye Motion

Non-voluntary eye motion developed for stabilizing an external image on a retina regardless of motions of the head or body.

(02) Voluntary Eye Motion

Eye motion developed to set a target image to the center of the retina and controlled voluntarily.

(03) Impulsive Eye Motion (Saccade)

Eye motion made when a focus point is changed to see an object (easy to detect).

(04) Slide Eye Motion

Smooth eye motion made when tailing an object moving slowly (hard to detect).

<Motion Range of Eyes (of an Ordinary Adult)>

(11) Horizontal Directions

Left direction: 50° or less

Right direction: 50° or less

(12) Vertical Directions

Lower direction: 50° or less

Upper direction: 30° or less (The range of angles voluntarily movable in the vertical directions is narrower in the upper direction. Since the Bell phenomenon in which eye rotate upward when eyes are closed, the eye motion range in the vertical directions shifts to the upper direction when the eyes are closed.)

(13) Others

Angle of convergence: 20° or less

FIG. 7 shows the data processor 11 attachable to the eyeglass-type wearable devices of various embodiments and peripheral devices. In the example of FIG. 7, the data processor 11 includes a processor 11e, nonvolatile memory 11b, main memory 11c, and communication processor 11d, for example. The processor 11a is a microcomputer having a computing performance corresponding to a product specification. Various programs executed by the microcomputer and various parameters used in the program execution can be stored in the nonvolatile memory 11b. The work area to execute the programs can be provided by the main memory 11c.

Commands to be executed by the processor 11 can be obtained via the communication processor 11d from an external server (or a personal computer) which is not shown. The communication processor 11d can use available communication schemes such as ZigBee (registered trademark), Bluetooth (registered trademark), and Wi-Fi (registered trademark). A process result from the processor 11a can be sent to the storage management server or the like through the communication processor 11d.

A system bus of the data processor 11 is connected to a display 12 (12R and 12L of FIGS. 1, 3, and 4), camera 13 (13R and 13L of FIG. 1), gesture detector 14, and eye motion detector 15. Power is supplied to each device (11 to 15) of FIG. 7 by a battery BAT.

The gesture detector 14 of FIG. 7 includes the electrodes 140 to 144 of capacitance sensors, and circuits to output data based on a change pattern of the above-described four voltage signals (Vrxbuf1 to Vrxbuf4) to the processor 11a. From the change pattern (for example, corresponding to a swiping up motion of a finger) of the four voltage signals (Vrxbuf1 to Vrxbuf4), the processor 11a interprets a command corresponding to the gesture of the user (for example, a command to scroll up the character strings in the image IM2 displayed on the display 12L of FIG. 3), and executes the upward scroll in the display 12. The command is an example of data input A using the gesture detector 14.

The eye motion detector 15 of FIG. 7 includes four eye motion detection electrodes (151a, 151b, 152a, and 152b) which are components of the sightline detection sensor, three ADCs (1510, 1520, and 1512) which extract digital signals corresponding to eye motions from the electrodes, and circuits to output the output data (data corresponding to detection signal waveforms of FIGS. 8 to 14) from ADCs to the processor 11a. From various eye motions (up-and-down, right-and-left, blinks, closed eyes, and the like) of the user, the processor 11a interprets a command corresponding to the eye motion type and executes the command.

Specific commands corresponding to the types of eye motions may be, for example, selecting a data item in the line of sight if the eye motion is closing eyes (similar to a click of a computer mouse), starting a process of the selected data item if the eye motion is continuous blinks or a wink (similar to double clicks of a computer mouse). The command is an example of data input B using the eye motion detector 15.

Figure 8:
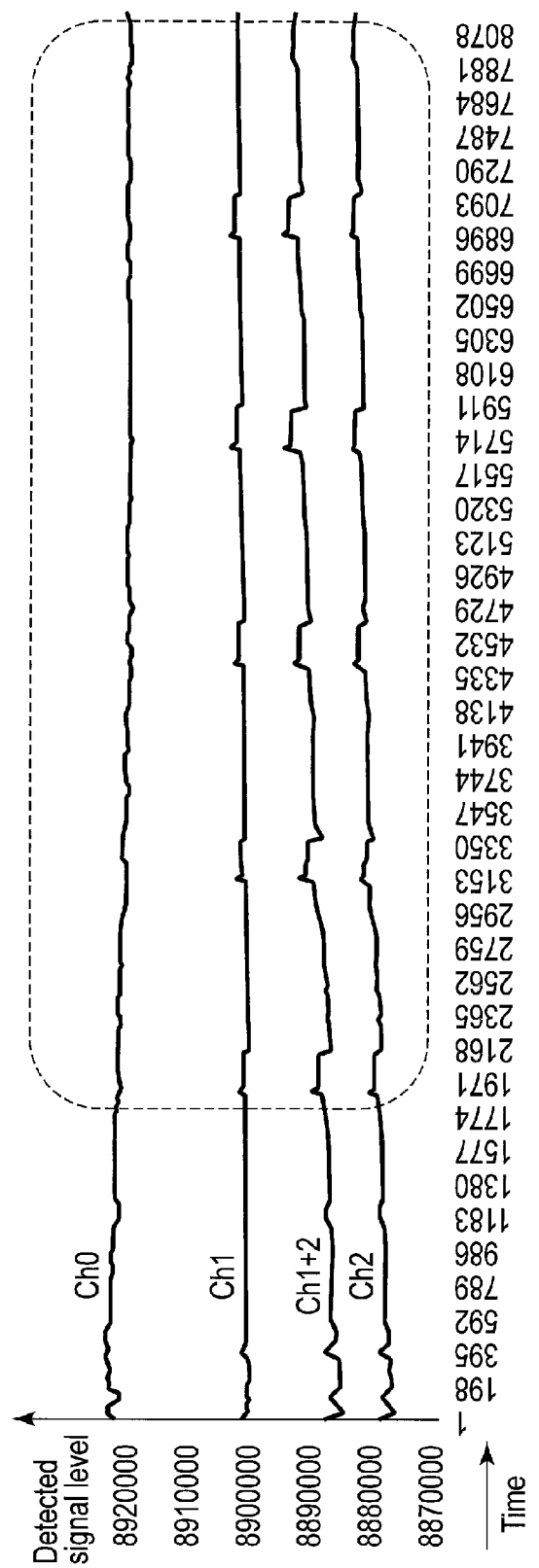
FIG. 8 shows an electro-oculogram (FOG) with respect to a relationship between eye motion from the front to the above and detection signal levels (Ch0, Ch1, Ch2, and average level Ch1+2 of Ch1 and Ch2) obtained from three analog/digital converters (ADCs) of FIG. 6.

Now, a method of detecting (estimating) an eyesight direction of a user will be explained. FIG. 8 shows an electro-oculogram (EGG) with respect to a relationship between an eye motion from the front to the above and detection signal levels (Ch0, Ch1, Ch2, and average level Ch1+2 of Ch1 and Ch2) obtained from ADCs (1510, 1520, and 1512) of FIG. 6. The eye motion detection is performed based on the detection signal waveforms in the broken-line frame in the figure. The reference of the detection is a case where there is no eye motion when a user seeing the direct front (in that case, a condition of left outside of the broken line frame of FIG. 8, and output signal waveforms Ch0 to Ch2 from the three ADCs of FIG. 6 are substantially flat while the user staring the direct front without blinking and there is almost no change through time).

The user sees the direct front with his/her both eyes, instantly moves the sight upward and maintain the upward stare for one second, and then instantly returns the stare in the front. This is repeated for five times and changes of the detection signal levels are shown in FIG. 8.

Figure 9:
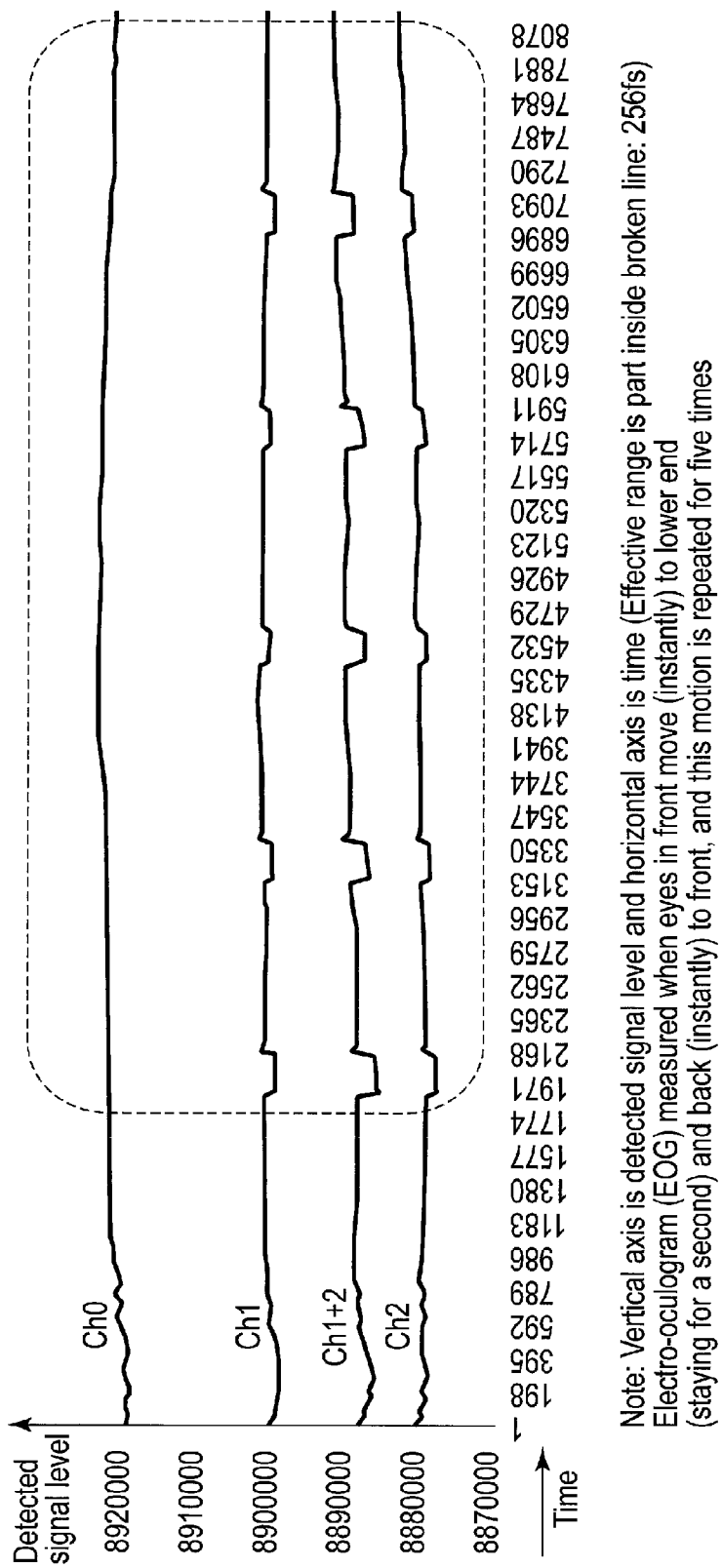
FIG. 9 shows an electro-oculogram (FOG) with respect to a relationship between eye motion from the front to the below and detection signal levels (Ch0, Ch1, Ch2, and average level Ch1+2 of Ch1 and Ch2) obtained from three ADCs of FIG. 6.

FIG. 9 shows an eye motion detection similar to that of FIG. 8 when the sight moves from the front to the below. From the waveform changes of FIGS. 8 and 9, whether the sight is upward or whether the sight is downward can be detected using the case where the sight is in front as a reference.

Figure 10:
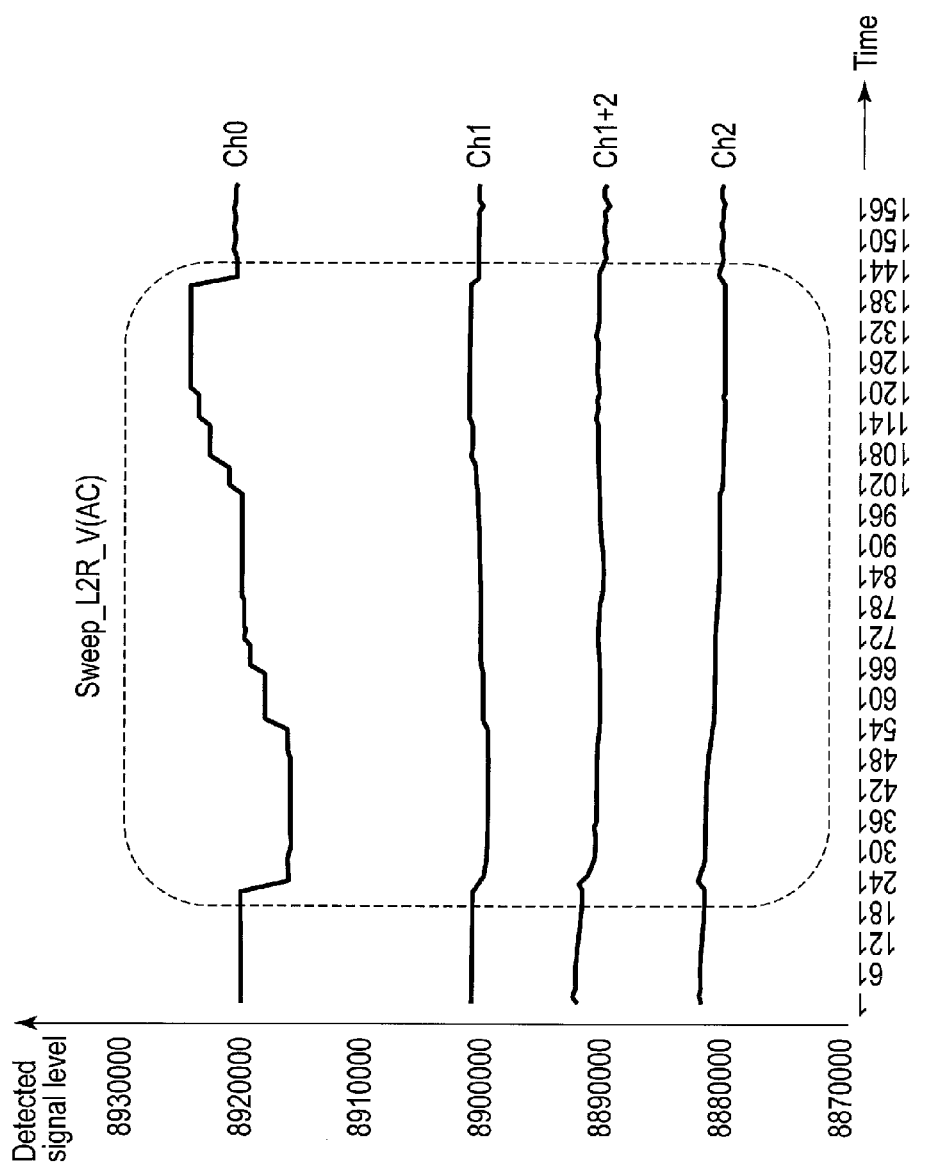
FIG. 10 shows an electro-oculogram (EGG) with respect to a relationship between eye motion from the left to the right and detection signal levels (Ch0, Ch1, Ch2, and average level Ch1+2 of Ch1 and Ch2) obtained from three ADCs of FIG. 6.

FIG. 10 shows an electro-oculogram (EGG) with respect to a relationship between an eye motion from the left to the right and detection signal levels (Ch0, Ch1, Ch2, and average level Ch1+2 of Ch1 and Ch2) obtained from the three ADCs of FIG. 6. With the eye motion from the left to the right, the change of the detection signal waveform of Ch0 through time goes up to the right side (although this is not shown, with the eye motion from the right to the left, the change of the detection signal waveform of Ch0 through time goes down to the right side). From the waveform changes of Ch0, whether the sight is rightward or whether the sight is leftward can be detected using the case where the sight is in front as a reference.

If the detection results of FIGS. 8 to 10 are combined, it can be known that which direction the sight points to the up, down, right, and left directions, using the case where the sight is in front as a reference.

Figure 11:
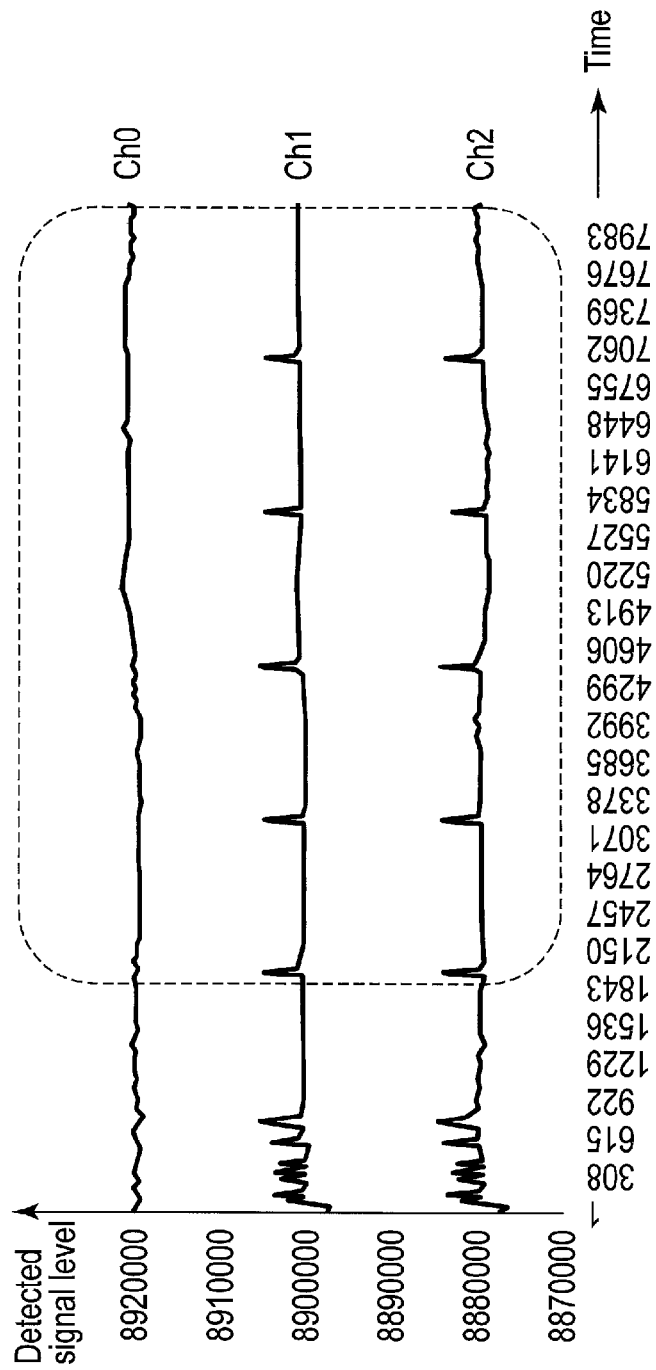
FIG. 11 shows an electro-oculogram (EGG) with respect to a relationship between eye motion repeating blinks (both eyes) for five times with five second intervals and detection signal levels (Ch0, Ch1, and Ch2) obtained from three ADCs of FIG. 6, where the sight is in front.

FIG. 11 shows an electro-oculogram (EGG) with respect to a relationship between an eye motion repeating blinks (both eyes) for five times with five second intervals and detection signal levels (Ch0, Ch1, and Ch2) obtained from the three ADCs of FIG. 6. Blinks of both eyes can be detected by pulses in Ch1 and Ch2. Blinks unconsciously performed by a user do not have a periodicity in most cases. Therefore, by detecting a plurality of pulses with certain (roughly constant) intervals as shown in FIG. 11, intentional blinks of a user can be detected. (Generally speaking, one blink motion takes 100 to 150 msec and the sight is blocked by a blink motion for approximately 300 msec.)

Figure 12:
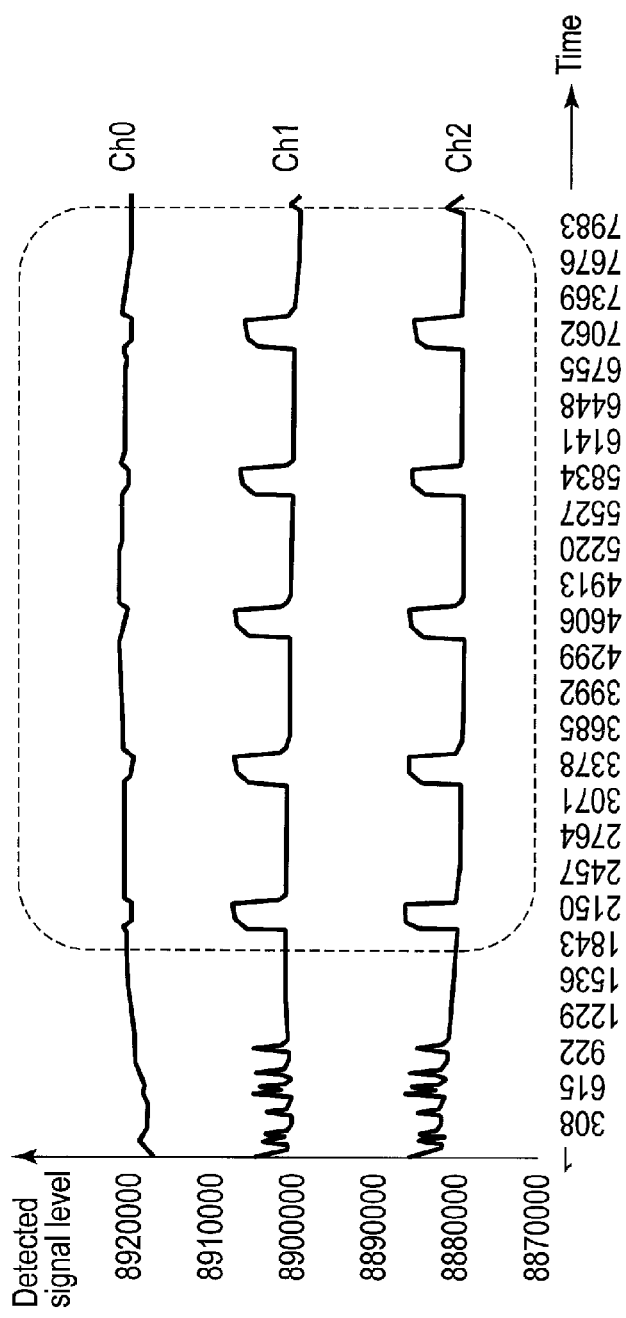
FIG. 12 shows an electro-oculogram (EGG) with respect to a relationship between eye motion repeating blinks (both eyes) including an eye closing for one second and an eye opening for four seconds for five times and detection signal levels (Ch0, Ch1, and Ch2) obtained from three ADCs of FIG. 6, where the sight is in front.

FIG. 12 shows an electro-oculogram (EGG) with respect to a relationship between an eye motion repeating blinks (both eyes) of an eye closing for one second and an eye opening for four seconds for five times and detection signal levels (Ch0, Ch1, and Ch2) obtained from the three ADCs of FIG. 6. Closing both eyes can be detected by a wide pulse in Ch1 and Ch2 (if eyes are closed intentionally, it takes longer than a blink and the pulse width detected becomes wider). By detecting the wide pulses of Ch1 and Ch2 shown in FIG. 12, the intentional eye closing of the user can be detected.

Note that, although this is not shown, a wide pulse shows in Ch1 when the user closes the right eye only and a wide pulse shows in Ch2 when the user closes the left eye only. Thus, a right eye closing and a left eye closing can be detected separately.

Figure 13:
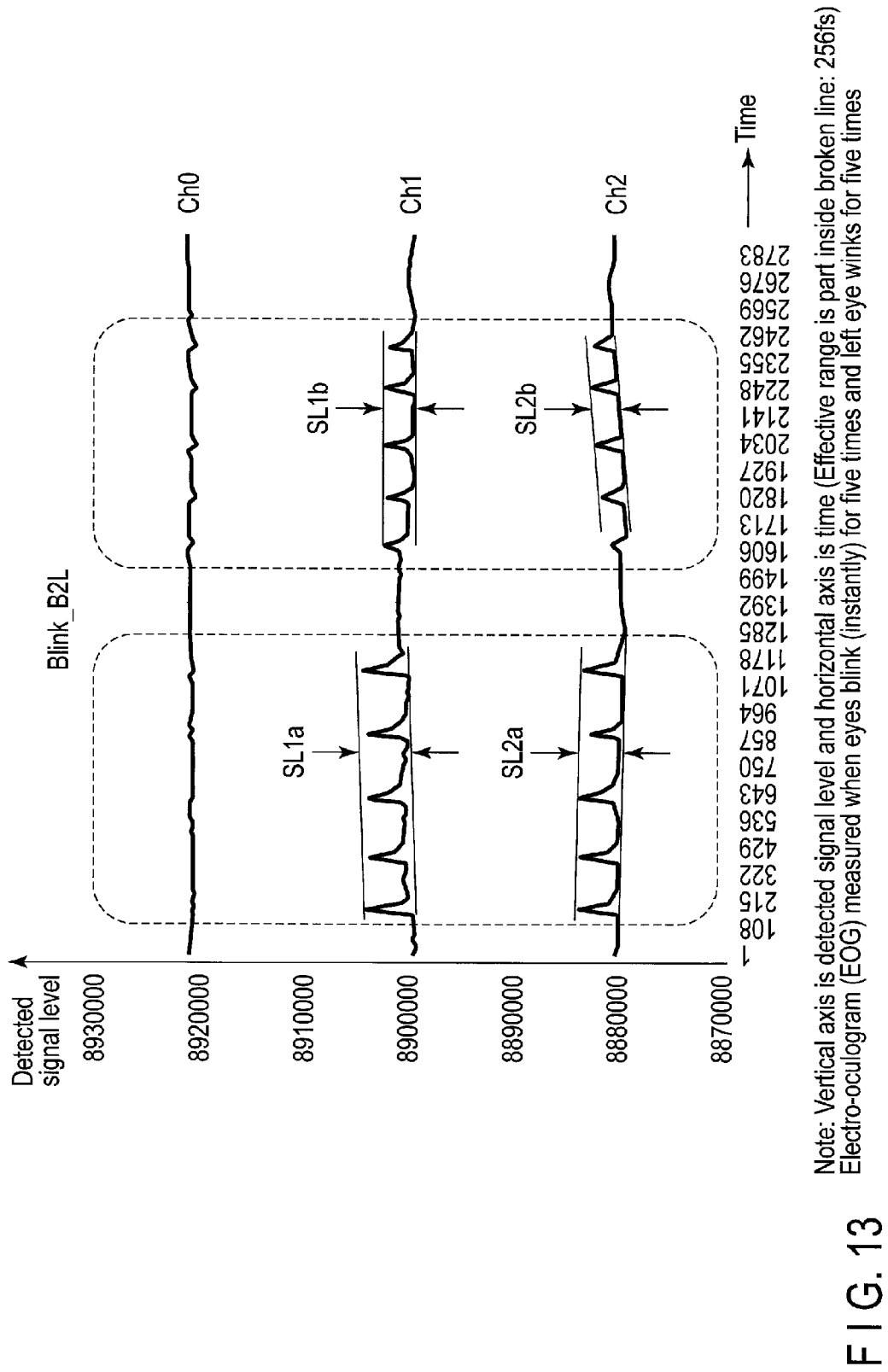
FIG. 13 shows an electro-oculogram (EGG) with respect to a relationship between eye motion repeating blinks (both eyes) for five times and repeating left eye winks (blinks of left eye) for five times with eyes front and detection signal levels (Ch0, Ch1, and Ch2) obtained from three ADCs of FIG. 6, where the sight is in front.

FIG. 13 shows an electro-oculogram (EGG) with respect to a relationship between an eye motion repeating blinks (both eyes) for five times and repeating left eye winks (blinks of left eye) for five times with eyes front and detection signal levels (Ch0, Ch1, and Ch2) obtained from the three ADCs of FIG. 6.

As shown in FIG. 6, the position of the ADC 1512 of Ch0 is offset lower than a center line of the right and left eyeballs. Because of the offset, negative direction potential changes appear in both + input and − input of the ADC 1512 of FIG. 6 when both eyes blink. Then, if the potential changes (amount and direction) of both + input and − input are substantially the same, these changes are almost canceled and the signal level output from the ADC 1512 of Ch0 may be substantially constant (cf. Ch0 level in a left broken line frame of FIG. 13). On the other hand, one eye (left eye) blink does not substantially change the potential at the − input side of the ADC 1512 and a relatively large negative direction potential change appears at the + input side of the ADC 1512. Then, a cancel amount of the potential changes between + input and − input of the ADC 1512 is reduced and a small pulse (small wave in the signal level) appears in the negative direction in the signal levels output from the ADC 1512 of Ch0 (cf. Ch0 level in a right broken line frame of FIG. 13). From the polarity of the small wave in the signal level (pulse in the negative direction), a left eye wink can be detected (an example of left wink detection using Ch0).

Note that, if the potential change of the + input and − input of the ADC 1512 cannot be set even because of the distortion of the face of the user or the skin condition, a calibration to set the output of the ADC of Ch0, detected when the user wears the eyeglass-type wearable device 100 and brinks both eyes, to minimum (to set a cancel amount between + input components and − input components maximum) should be performed in advance.

Furthermore, if a peak ratio SL1*a*/SL2*a* of the detection signals Ch1/Ch2 at the time of a both eye wink is used as a reference, a peak ratio SL1*b*/SL2*b* at the time of a left eye wink changes (SL1*b*/SL2*b* is not equal to SL1*a*/SL2*a*). From this point, a left wink can be detected.

Figure 14:
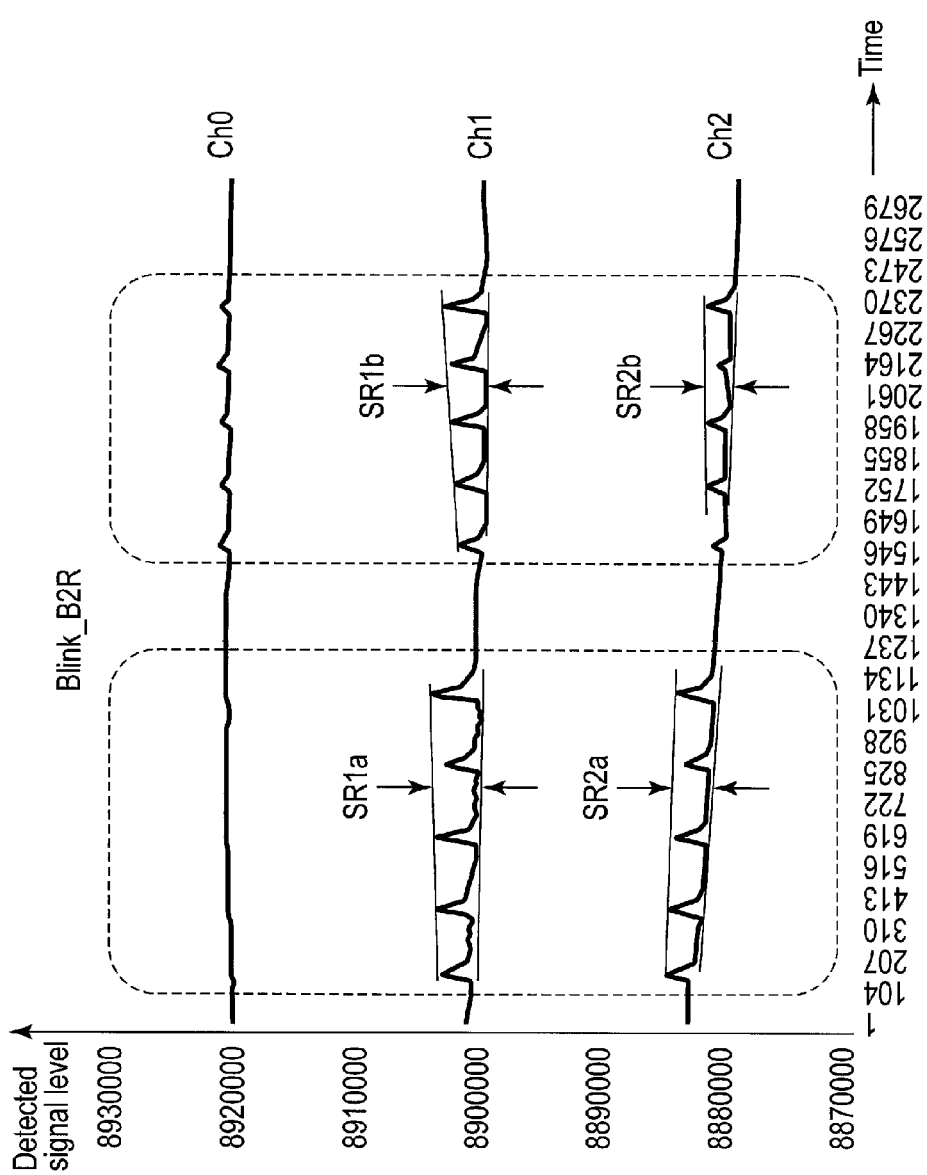
FIG. 14 shows an electro-oculogram (EGG) with respect to a relationship between eye motion repeating blinks (both eyes) for five times and repeating right eye winks (blinks of right eye) for five times with eyes front and detection signal levels (Ch0, Ch1, and Ch2) obtained from three ADCs of FIG. 6, where the sight is in front.

FIG. 14 shows an electro-oculogram (EGG) with respect to a relationship between an eye motion repeating blinks (both eyes) for five times and repeating right eye winks (blinks of right eye) for five times with eyes front and detection signal levels (Ch0, Ch1, and Ch2) obtained from the three ADCs of FIG. 6.

As stated above, the position of the ADC 1512 of FIG. 6 is offset lower than a center line of the right and left eyeballs. Because of the offset, negative direction potential changes appear in both + input and − input of the ADC 1512 of FIG. 6 when both eyes blink. Then, if the potential changes (amount and direction) of both + input and − input are substantially the same, these changes are almost canceled and the signal level output from the ADC 1512 of Ch0 may be substantially constant (cf. Ch0 level in a left broken line frame of FIG. 14). On the other hand, one eye (right eye) blink does not substantially change the potential at the + input side of the ADC 1512 and a relatively large negative direction potential change appears at the − input side of the ADC 1512. Then, a cancel amount of the potential changes between + input and − input of the ADC 1512 is reduced and a small pulse (small wave in the signal level) appears in the positive direction in the signal levels output from the ADC 1512 of Ch0 (cf. Ch0 level in a right broken line frame of FIG. 14). From the polarity of the small wave in the signal level (pulse in the negative direction), a right eye wink can be detected (an example of right wink detection using Ch0).

Furthermore, if a peak ratio SR1*a*/SR2*a* of the detection signals Ch1/Ch2 at the time of a both eye wink is used as a reference, a peak ratio SR1*b*/SR2*b* at the time of a right eye wink changes (SR1*b*/SR2*b* is not equal to SR1*a*/SR2*a*). Furthermore, the peak ratio SL1*b*/SL2*b* of a left wink and the peak ratio SR1*b*/SR2*b* of a right wink may be different (how different they are can be confirmed by an experiment).

From this point, a right wink can be detected separately from the left wink (an example of right and left wink detections using Ch1 and Ch2).

Using Ch0 or Ch1/Ch2 for detecting the right and left winks can be arbitrarily determined by a device designer. Results of right and left wink detections using Ch0 to Ch2 can be used as operation commands.

FIG. 15 is a flowchart which shows processes performed by combinations of gesture data inputs (data input A) and eye motion data inputs (data input B) when the eyeglass-type wearable device of FIG. 3 is used, for example.

For example, the eyeglass-type wearable device 100 of FIG. 3 with the data processor 11 of FIG. 7 is wirelessly connected to a server (not shown).

If an item list related to a plurality of items is sent from a server to the device 100 through, for example, Wi-Fi, data of the item list are stored in the memory 11*c* of FIG. 7. A program executed in the processor 11*a* displays an image IM1 (or IM2) of at least part of item data from the data of the items included in the stored item list on the right display 12R (or the left display 12L) (ST10 of FIG. 15). The image display may be performed in the right display 12R in default. However, there may be a user who does not prefer a gesturing finger is seen moving ahead of the right display, and thus, the image display may be performed in the left display 12L at which a finger of the right hand is not easily seen if the user choose so (optionally).

If currently necessary item data (name of the item and an ID code thereof) are not being displayed in the displayed list, the user with the device 100 moves, for example, his/her right index finger swiping up in front of the right eye frame 12R with the electrodes (141 to 144) of the gesture detector 14. Then, the type of the motion (one of the gestures) is determined (ST12), and the data input A corresponding to the motion is generated in the gesture detector 14 (ST14).

The data input A is sent to the processor 11a through the system bus of FIG. 7. Then, the program executed in the processor 11a scrolls up the item data in the image IM1 (or IM2) displayed in the right display 12 (or the left display 12L) (ST16). By repeating the finger swiping up gesture, the item data in the image IM1 (or IM2) can be scrolled up to the end.

If desired item data are not found through the scroll, the right index finger, for example, is swiped down. The type of the motion (one of the gestures) is determined (ST12), and data input A corresponding to the motion is generated in the gesture detector 14 (ST14). The data input A is sent to the processor 11a, and the item data in the image IM1 (or IM2) displayed in the right display 12R (or in the left display 12L) are scrolled downward (ST16). By repeating the finger swiping down gesture, the item data in the image IM1 (or IM2) can be scrolled down to the end.

If a plurality of item lists are displayed in the image IM (or IM2), the item list seen by the user can be detected by the sightline detection sensor of the eye motion detector 15. Now, for a simplified explanation, a case where three item data lines (upper, middle, and lower lines) are displayed in the image IM1 (or IM2) is given.

When the user stares in front and stays still, signal waveforms of the three ADCs (Ch0 to Ch2) of FIG. 6 are all substantially flat. Then, the sightline of the user is determined to be directed to the middle item data displayed in the image IM1 (or IM2) (or the user is estimated to see the item data in the middle line).

When the user stares in front and looks up, signal waveforms of the three ADCs (Ch0 to Ch2) of FIG. 6 show upward pulses (FIG. 8). Then, the sightline of the user is determined to be directed to the upper item data displayed in the image IM1 (or IM2) (or the user is estimated to see the item data in the upper line).

When the user stares in front and looks down, signal waveforms of the three ADCs (Ch0 to Ch2) of FIG. 6 show downward pulses (FIG. 9). Then, the sightline of the user is determined to be directed to the lower item data displayed in the image IM1 (or IM2) (or the user is estimated to see the item data in the lower line).

When the user stares in front and closes both eyes for a short period (0.5 to 1.0 seconds), upward pulses having waveforms different from that of FIG. 8 show (FIG. 12). Then, the item data displayed in the center of the image IM1 (or IM2) are determined to be selected by the user (similar to one click by a computer mouse). Similarly, if the user looks up and closes both eyes, the item data in the upper line are determined to be selected, and if the user looks down and closes both eyes, the item data in the lower line are determined to be selected.

After the selection of the item data, if the user looks in front and instant blinks (0.2 to 0.3 seconds) for a few times by both eyes, a few sharp pulses occur (FIG. 11). Then, the selection of the item data displayed in the center of the image IM1 (or IM2) is determined to be decided by the user (similar to double clicks by a computer mouse). Similarly, if the user looks up and blinks for a few times by both eyes, the selection of the item data in the upper line is determined to be decided, while if the user looks down and blinks for a few times by both eyes, the selection of the item data in the lower line is determined to be decided.

After the selection of the item data, if a left wink is performed (FIG. 13), an operation corresponding to the wink can be performed. For example, if the user looks in front and winks the left eye, a cursor (not shown) in the character strings of the item data displayed in the center of the image IM1 (or IM2) can be moved to the left. Conversely, if a right wink is performed, the cursor (not shown) in the character strings of the item data displayed in the center of the image IM1 (or IM2) can be moved to the right.

As can be understood from the above, the eye motions of the user including the eye direction of the user (up-and-down and right-and-left motions, blinks, closed eyes, winks, and the like) can be determined using combination of various signal waveforms obtained from the sightline detection sensor of the eye motion detector 15 (S122).

After the determination of the eye motion of the user including the eye direction of the user (ST22), a data input B corresponding a determination result is generated by the eye motion detector 15 (ST 24). The data input B is sent to the processor 11a, and the processor 11a performs the process corresponding to the data input B (ST26). For example, the processor 11a determines that an item (not shown) corresponding to the selected item data is picked up by the user from the storage rack in the warehouse, and modifies the item list stored in the memory 11c. Then, the modified list is informed to the server (not shown) through Wi-Fi (S126). Or, the user can add a desired value code or the like to the selected item data using a ten-key in the image IM1 (or IM2) displayed in the right display 12R (or left display 12L) of FIG. 3, for example (ST26).

The process of FIG. 15 is repeated while either the process based on data input A or the process based on data input B is performed (NO in ST28). The process of FIG. 15 is terminated if both the process based on data input A and the process based on data input B are finished (YES in ST28).

Steps ST12 to ST16 of FIG. 15 (the process based on data input A) are performed by a gesture of the user (for example, hand or finger motion) and steps ST22 to S126 (the process based on data input B) are performed by an eye motion of the user. The process of the data input A and the process of the data input B are in cooperation but independent as operations of the user. Therefore, eye strain is small as compared to a case where the data input is performed by the eye motion only. On the other hand, if a gesture input cannot be performed when using both hands, data input by eye motion only can be performed.

Furthermore, the eyeglasses-type wearable device 100 of the embodiments can be operated without touching by hands, and even if fingers are dirty, data input can be performed without dirtying the device 100.

Note that the device may be structured such that the user can touch any of the electrodes 141 to 144 (with clean fingers). In that case, the capacitance sensor 14 can be used as a pointing device like a touch pad (a variation of ST12 to ST16 of FIG. 15). For example, in the structure of FIG. 3, a ten-key and a cursor are shown in the display 12R, and the cursor can be moved by touching any of the electrodes 141 to 144 of the capacitance sensor 14 by a finger. Then, the closed-eyes, blinks, and (right and left) winks detected by the sightline detection sensor 15 are prepared as commands, and a value (character) on which the cursor is positioned can be selected or decided (entered). As above, using a method other than a gesture, data input A from the capacitance sensor 14 and data input B from the sightline detection sensor 15 can be combined and various data inputs can b achieved.

In the combination data input operation (combination of data input A and data input B), an image process of an image taken by a camera or a recognition process of audio caught by a microphone can be unnecessary. Therefore, even in a dark environment unsuitable for a proper image process or in a noisy environment unsuitable for a proper audio input, various data inputs can be performed without touching a specific object. In other words, various data inputs can be performed regardless of the brightness or the darkness of the operation environment or of the noise of the operation environment.

Furthermore, the eyeglasses-type wearable device of an embodiment includes a plurality of eye motion detection electrodes 151a, 151b, 152a, and 152b directly contacting the user, but these electrodes are only provided with the nose pads (150R and 150L) (the electrodes 140 to 144 of the gesture detector do not directly contact the user). Since the nose pads are used in ordinary glasses, the eyeglasses-type wearable device of the embodiment can be worn by a person who wears glasses ordinarily without feeling uncomfortable. (If a directly-touching detection electrode is provided with a part which does not conventionally contact a user such as a bridge part between the right and left eye frames, some user may feel uncomfortable or may be irritated. However, since the detection electrodes are provided with only the part which contacts the user in the ordinary glasses (with the nose pads or the temple bars), the eyeglasses-type wearable device of the embodiments can be worn without feeling uncomfortable.)

[1] According to an embodiment, an eyeglasses-type wearable device (100 in FIGS. 1, 3, and 4) has right and left eye frames (101, 102) corresponding to positions of right and left eyes and nose pads (150R, 150L) corresponding to a position of a nose. The eyeglasses-type wearable device includes a display (12R, 12L) provided with at least one of the right and left eye frames, a gesture detector (14 in FIG. 7) which detects a gesture indicative of a movement of a user, and an eye motion detector (15 in FIG. 7) which detects eye motion or eye movement of the user.

The eyeglasses-type wearable device performs data input using a combination of a first data input (data input A) corresponding to the gesture detected by the gesture detector and a second data input (data input B) corresponding to the eye motion detected by the eye motion detector.

[2] The gesture detector (14 in FIG. 3) comprises a capacitance sensor including a plurality of electrodes (141 to 144 and 141* to 144*), and the electrodes are provided with at least one of the right and left eye frames (101, 102).

[3] The eyeglasses-type wearable device (100 in FIG. 4) includes right and left temple bars (106, 107) connected to side ends of the right and left eye frames (101, 102), respectively. The gesture detector (14 in FIG. 4) comprises one or more tabs (14, 14T) on which a capacitance sensor including a plurality of electrodes (141 to 144 and 141* to 144*) is formed, and the tabs are provided with at least one of the right and left temple bars (106, 107).

[4] The gesture detector (14) includes a capacitance sensor including a plurality of electrodes (transmitter electrode 140 and upper, lower, right, and left receiver electrodes 141 to 144). A plurality of capacitances (Crxtx, Crxg) formed in the electrodes, and a plurality of electrode signals (Vrxbuf: electrode signals Vrxbuf1 to vrxbuf4 from four respective receiver electrodes) as a function (Vtx*Crxtx/(Crxtx+Crxg+Ch)) of a capacitance (Ch) which changes depending on a gesture of the user (for example, a movement of a finger of the user) are obtained by the gesture detector (14). The first data input (data input A) corresponding to the gesture (for example, upward movement of a finger) can be generated based on the electrode signals.

[5] The eye motion detector (15) includes a plurality of eye motion detection electrodes (151a, 151b, 152a, 152b) on the nose pads (150R, 150L). The second data input (data input B) is generated based on a relationship between a detection signal waveform (for example, pulses of Ch1 and Ch2 in FIG. 11) of the eye motion of the user detected by the eye motion detection electrodes and the eye motion of the user (for example, a blink).

[6] The eye motion detection electrodes include upper and lower electrodes (151a and 151b, and 152a and 152b of FIG. 6) at both the right and left sides. Eye motion or eye movements in up-and-down directions (FIGS. 8 and 9), blinks (FIG. 11), closed eyes (FIG. 12), and winks (FIGS. 13 and 14) are detected based on a change in the detection signal waveform (ADC outputs from Ch1 and/or Ch2) from at least a pair of the upper and lower electrodes (151a and 151b and/or 152a and 152b). Furthermore, eye motion or eye movements in right-and-left directions (FIG. 10) are detected from a change in the detection signal waveform (ADC outputs of Ch0) from one of the upper and lower electrodes at the right side (for example, 151b) and one of the upper and lower electrodes at the left side (for example, 152b) of the upper and lower electrodes at both the right and left sides. An eyesight direction of the user is determined based on a detection result of the eye motion or eye movements in up-and-down directions (FIGS. 8 and 9) and/or the eye motion or eye movements in right-and-left directions (FIG. 10). Furthermore, the second data input (for example, data input B used for selection of a specific letter string or icon viewed by the user) related to the eyesight direction of the user based on a detection result of the blinks (FIG. 11), closed eyes (FIG. 12), and winks (FIGS. 13 and 14).

[7] The eye motion detection electrodes (151a, 151b, 152a, 152b) perform sufficiently if they are simply provided with the nose pads (150R, 150L). There is no necessity of providing an additional electrode with the bridge 103 of the glasses to contact the brow of the user. The eye motion detection electrodes are provided with the nose pads alone which are adopted in ordinary glasses. Thus, a person who wears glasses do not feel uncomfortable.

[8] The nose pads (150R, 150L) are formed of an insulating material (dielectric) such as ceramics, plastics, and rubbers. The eye motion detection electrodes (151a, 151b, 152a, 152b) are provided with the nose pads (150R, 150L) to be separated from each other (metal fragments attachment, metal evaporation, conductor printing, metal ring attachment, and the like as exemplified in FIG. 5).

[9] The display (12) includes a display device (12R, 12L) to be fit in the eye frames (101, 102). The display device is prepared by cutting a transparent plate or a lens suitable for a user to fit the shape of the eye frame and attaching film liquid crystal thereto.

Using the first data input (data input A) corresponding to the gesture, scroll and pointing can be performed with respect to the data items displayed on the display device.

[10] In addition to the above [9], using the second data input (data input B), selection and determination can be performed with respect to the data items displayed on the display device.

[11] A method according to one embodiment (FIG. 15) uses an eyeglasses-type wearable device with right and left eye frames corresponding to positions of right and left eyes and nose pads corresponding to a position of a nose. The eyeglasses-type wearable device includes a display provided with at least one of the right and left eye frames, a gesture detector which detects a gesture indicative of a movement of a user, and an eye motion detector which detects eye motion or eye movement of the user.

In this method, a first data input (data input A) corresponding to the gesture detected by the gesture detector is generated (ST14). A second data input (data input B) corresponding to the eye motion or eye movement detected by the eye motion detector (ST24) is generated. A specific process is performed based on a combination of the first data input (data input A) and the second data input (data input B) (ST16, ST26).

[12] A method according to another embodiment uses an eyeglasses-type wearable device with right and left eye frames corresponding to positions of right and left eyes and nose pads corresponding to a position of a nose. The eyeglasses-type wearable device includes a display provided with at least one of the right and left eye frames, a detector configured to detect a movement of a user (using capacitance sensors as a touch pad), and an eye motion detector which detects eye motion or eye movement of the user.

In this method, a first data input (data input A) corresponding to the gesture detected by the detector is generated. A second data input (data input B) corresponding to the eye motion or eye movement detected by the eye motion detector is generated. A specific process is performed based on a combination of the first data input (data input A) and the second data input (data input B).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

For example, the embodiments are described above to be used in the eyeglasses-type wearable device having a frame shape of ordinary glasses. However, the embodiments can be applied to devices having a shape and structure other than such a frame shape of ordinary glasses. Specifically, a gesture detector and an eye motion detector can be provided with eyeglasses-type wearable devices such as goggles used in skiing and snowboarding for blocking harmful ultraviolet and securing visibility in rough conditions. Or, goggles may be used to cover the eyeglasses-type wearable device of the embodiments as shown in FIG. 3. Furthermore, the scope of the inventions includes providing a member with an electrode (whether or not it contacts the brow of a user is irrelevant) with any optional part of the glasses such as a bridge as long as the structures recited in the claims are maintained.

The embodiments and their variations are encompassed by the scope and outline of the invention and by the inventions recited in claims and their equality. Note that a part or the whole of an embodiment of the disclosed embodiments combined to a part or the whole of another embodiment of the disclosed embodiments will be encompassed by the scope and outline of the invention.

What is claimed is:

1. An eyeglasses-type wearable device with right and left eye frames corresponding to positions of right and left eyes and right and left nose pads corresponding to a position of a nose, the device comprising
    a display provided at least one of the right and left eye frames;
    a gesture detector configured to detect a gesture indicative of a movement of a user; and
    an eye motion detector configured to detect eye motion or eye movement of the user, the eye motion detector comprises a plurality of eye motion detection electrodes on the right and left nose pads, each of the right and left nose pads including a first electrode located at an upper portion of each nose pad of the right and left nose pads and a second electrode located at a lower portion of each nose pad of the right and left nose pads, wherein
    a first data input corresponding to the gesture detected by the gesture detector and a second data input corresponding to the eye motion or eye movement detected by the eye motion detector are combined for data input, the second data input is generated based on a relationship between a detection signal waveform detected by the eye motion detection electrodes, the detection signal waveform being indicative of a potential difference between the first electrode and the second electrode, and the eye motion or eye movement of the user,
    the gesture detector comprises a capacitance sensor provided at one of the right eye frame and the left eye frame and a transmitter electrode provided at the one of the right eye frame and the left eye frame,
    the capacitance sensor comprises first, second, third, and fourth electrodes, the first electrode is provided at an upper side of the one of the right eye frame and the left eye frame,
    the second electrode is provided at a lower side of the one of the right eye frame and the left eye frame,
    the third electrode is provided at a right side of the one of the right eye frame and the left eye frame, and
    the fourth electrode is provided at a left side of the one of the right eye frame and the left eye frame.

2. The eyeglasses-type wearable device of claim 1, wherein the gesture detector comprises a capacitance sensor including a plurality of electrodes, and
    the first data input corresponding to the gesture is generated based on a plurality of capacitances formed by the electrodes and a plurality of electrode signals which are a function of the capacitances changing with the gesture of the user.

3. The eyeglasses-type wearable device of claim 1, wherein the eye motion detector comprises a plurality of eye motion detection electrodes on the right and left nose pads, each of the nose pads including a first electrode located at an upper portion and a second electrode located at a lower portion, and
    detect eye motion or eye movements in up-and-down directions, blinks, closed eyes, or winks based on a change in a first detection signal waveform detected by the eye motion detection electrodes and indicative of a potential difference between the first electrode and the second electrode,
    detect eye motion or eye movements in right-and-left directions from a change in a second detection signal waveform detected by the eye motion detection electrodes and indicative of a potential difference between one of the first and second electrodes at the right nose pad and one of the first and second electrodes at the left nose pad,
    determines an eyesight direction of the user based on a detection result of the eye motion or eye movements in up-and-down directions and/or the eye motion or eye movements in right-and-left directions, and
    generate the second data input related to the eyesight direction of the user based on a detection result of the blinks, closed eyes, and winks.

4. The eyeglasses-type wearable device of claim 3, wherein the eye motion detection electrodes are provided at the nose pads alone.

5. The eyeglasses-type wearable device of claim 3, wherein the eye motion detection electrodes are provided at the nose pads to be separated from each other.

6. The eyeglasses-type wearable device of claim 1, wherein the display includes a display device fit in the eye frame, and
scroll or pointing is performed with respect to data items displayed on the display device using the first data input corresponding to the gesture.

7. The eyeglasses-type wearable device of claim 1, wherein the display includes a display device fit in the eye frame, and
selection or determination is performed with respect to data items displayed on the display device using the second data input corresponding to the eye motion or eye movements.

8. A method using an eyeglasses-type wearable device with right and left eye frames corresponding to positions of right and left eyes and nose pads corresponding to a position of a nose, the device comprising a display provided at least one of the right and left eye frames, a gesture detector which detects a gesture indicative of a movement of a user, and an eye motion detector which detects eye motion or eye movement of the user, wherein the gesture detector comprises a capacitance sensor provided at the right eye frame or the left eye frame and a transmitter electrode provided at the right eye frame or the left eye frame, the capacitance sensor comprises first, second, third, and fourth electrodes, the first electrode is provided at an upper side of the eye frame, the second electrode is provided at a lower side of the eye frame, the third electrode is provided at a right side of the eye frame, and the fourth electrode is provided at a left side of the eye frame the method comprising:
generating a first data input corresponding to movements detected by the gesture detector;
generating a second data input corresponding to eye motion or eye movements detected by the eye motion detector; and
executing a predetermined process using a combination of the first data input and the second data input,
wherein the eye motion detector comprises a plurality of eye motion detection electrodes on the right and left nose pads, each of the right and left nose pads including a first electrode located at an upper portion of each nose pad of the right and left nose pads and a second electrode located at a lower portion of each nose pad of the right and left nose pads, and
wherein the second data input is generated based on a relationship between a detection signal waveform detected by the eye motion detection electrodes, the detection signal waveform being indicative of a potential difference between the first electrode and the second electrode, and the eye motion or eye movement of the user.

* * * * *